(12) United States Patent
Muenz et al.

(10) Patent No.: US 7,538,948 B2
(45) Date of Patent: May 26, 2009

(54) OPTICAL ILLUMINATION SYSTEM FOR CREATING A LINE BEAM

(75) Inventors: Holger Muenz, Aalen (DE); Alois Herkommer, Aalen (DE); Rafael Egger, Aalen (DE)

(73) Assignee: Carl Zeiss Laser Optics GmbH, Oberkochen (DE)

( * ) Notice: Subject to any disclaimer, the term of this patent is extended or adjusted under 35 U.S.C. 154(b) by 0 days.

(21) Appl. No.: 11/318,127

(22) Filed: Dec. 22, 2005

(65) Prior Publication Data
US 2006/0209310 A1  Sep. 21, 2006

Related U.S. Application Data

(63) Continuation-in-part of application No. PCT/EP2005/012879, filed on Dec. 2, 2005.

(60) Provisional application No. 60/638,263, filed on Dec. 22, 2004.

(51) Int. Cl.
G02B 27/10 (2006.01)

(52) U.S. Cl. .................... 359/618; 359/619
(58) Field of Classification Search ........... 359/618
See application file for complete search history.

(56) References Cited

U.S. PATENT DOCUMENTS

| | | | |
|---|---|---|---|
| 4,974,919 A * | 12/1990 | Muraki et al. | 359/204 |
| 5,815,494 A | 9/1998 | Yamazaki et al. | |
| 6,100,961 A | 8/2000 | Shiraishi et al. | |
| 6,151,168 A | 11/2000 | Goering et al. | |
| 6,249,385 B1 | 6/2001 | Yamazaki et al. | |
| 6,261,856 B1 | 7/2001 | Shinohara et al. | |
| 6,707,614 B2 * | 3/2004 | Tanaka | 359/626 |
| 2002/0027716 A1 | 3/2002 | Tanaka | |
| 2002/0146873 A1 | 10/2002 | Tanaka | |
| 2002/0159152 A1 | 10/2002 | Hansen | |
| 2003/0190797 A1 | 10/2003 | Tanaka et al. | |
| 2005/0048383 A1 * | 3/2005 | Taniguchi et al. | 430/5 |
| 2005/0111105 A1 * | 5/2005 | Tanaka | 359/619 |

FOREIGN PATENT DOCUMENTS

| | | |
|---|---|---|
| EP | 1 003 207 | 5/2000 |
| EP | 1 055 479 | 11/2000 |
| WO | 01/27686 | 4/2001 |

* cited by examiner

Primary Examiner—Jordan M. Schwartz
Assistant Examiner—James C Jones
(74) Attorney, Agent, or Firm—Fish & Richardson P.C.

(57) ABSTRACT

In one aspect, the disclosure features an optical system configured to create from a beam of light an intensity distribution on a surface, whereby the optical system comprises at least a first optical element which splits the incident beam into a plurality of beams some of which at least partially overlap in a first direction on said surface and whereby the optical system further comprises at least a second optical element which displaces at least one of said beams in a second direction on said surface.

48 Claims, 21 Drawing Sheets ( state of the art )

(state of the art)

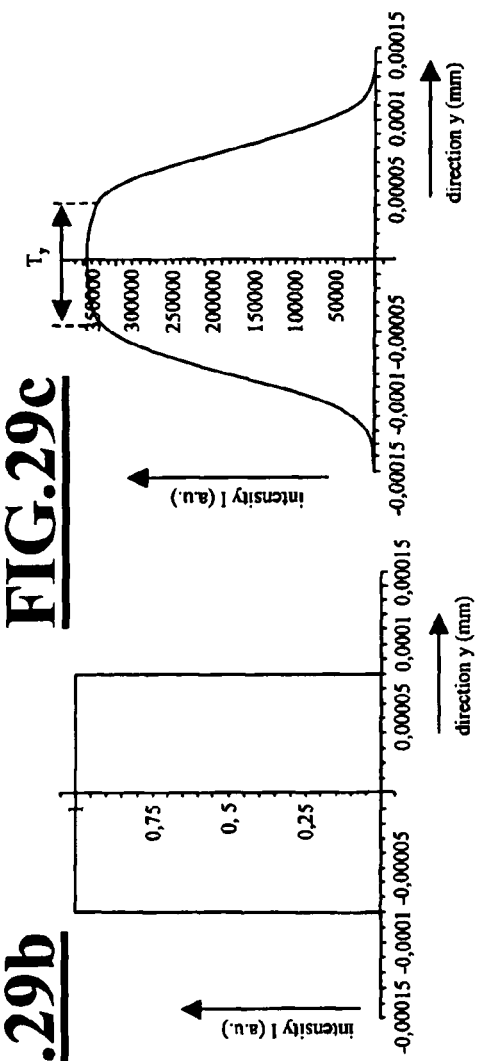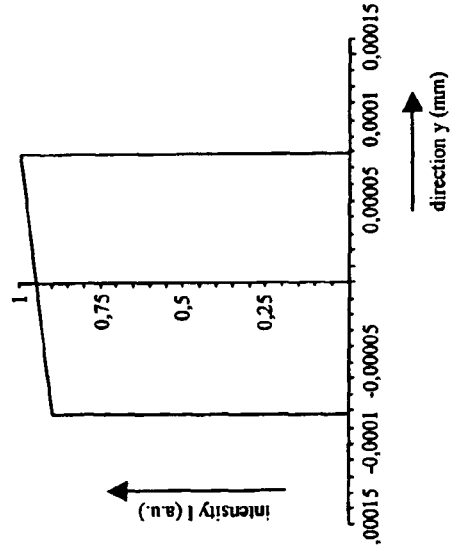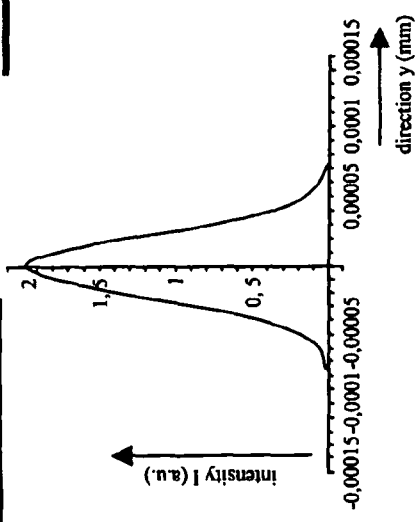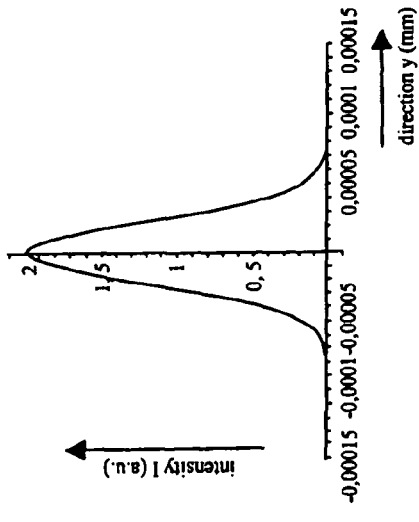

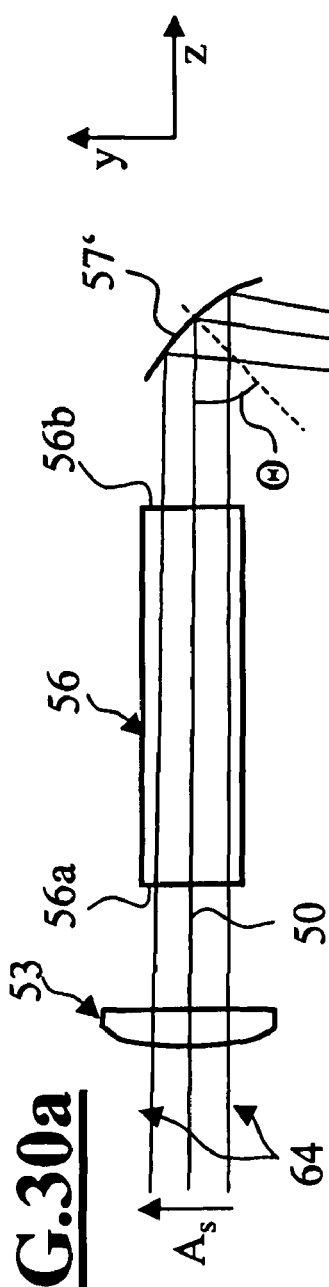
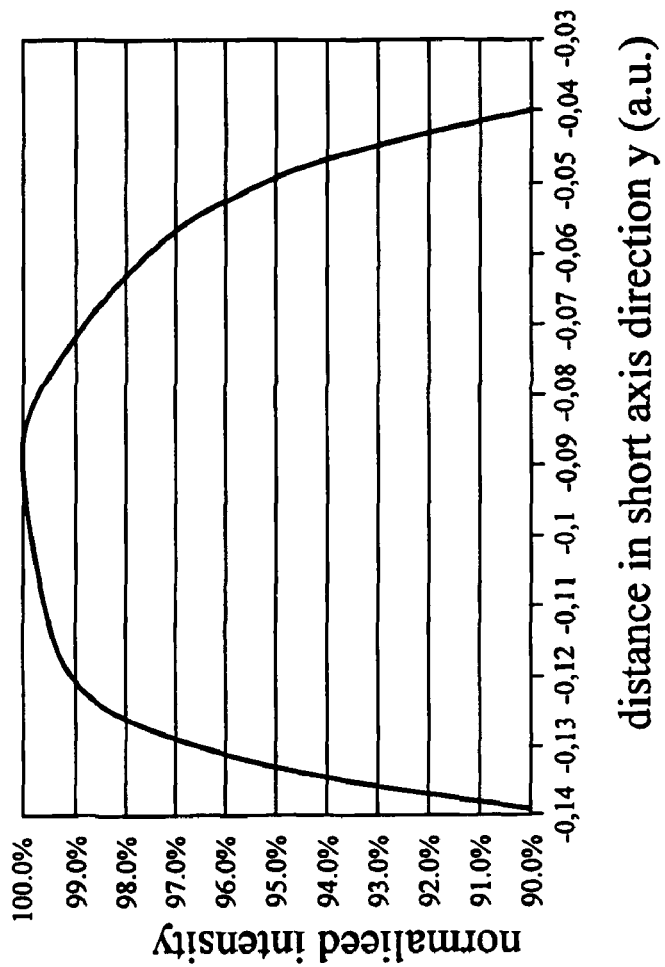
FIG.30a
FIG.30b

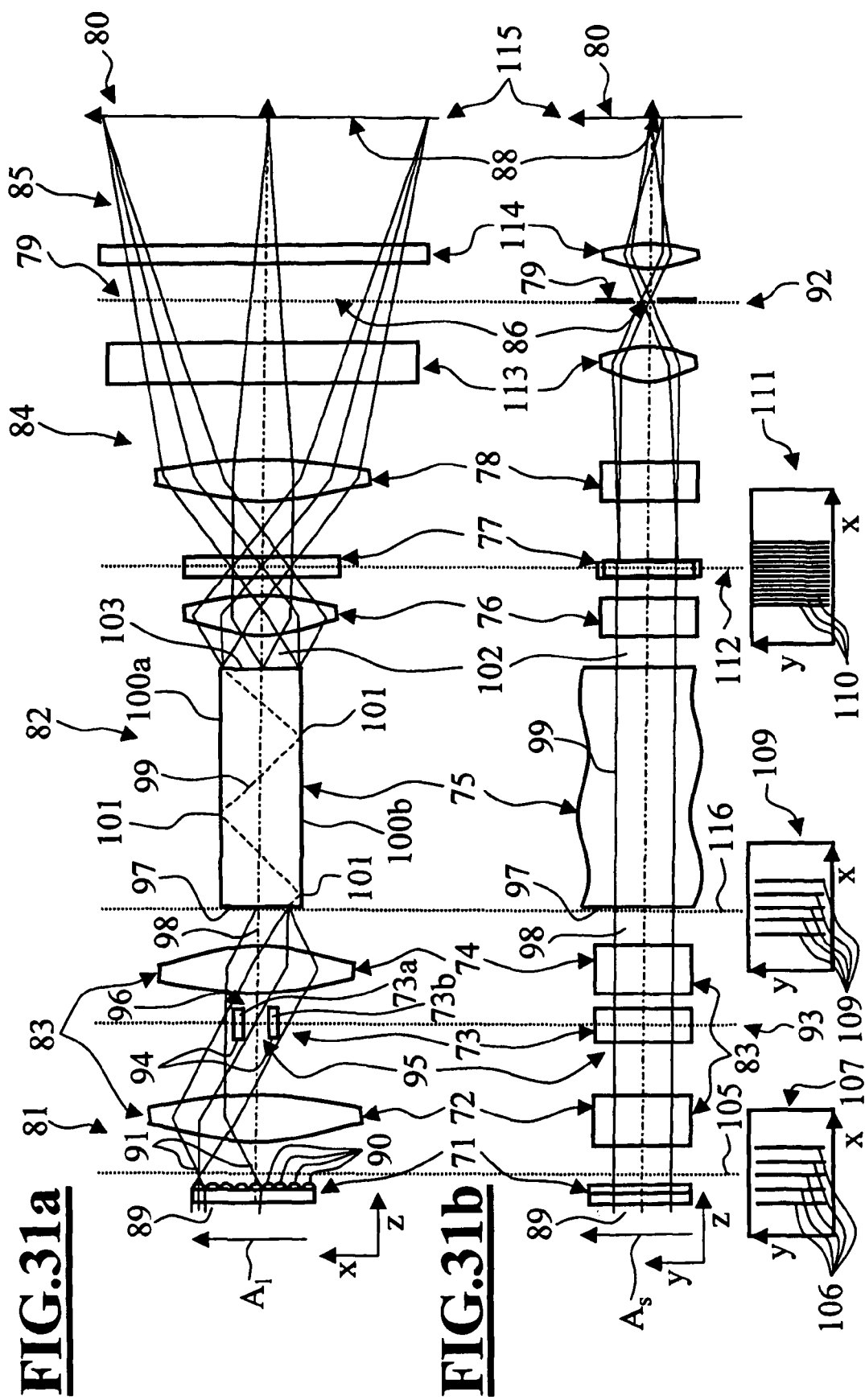

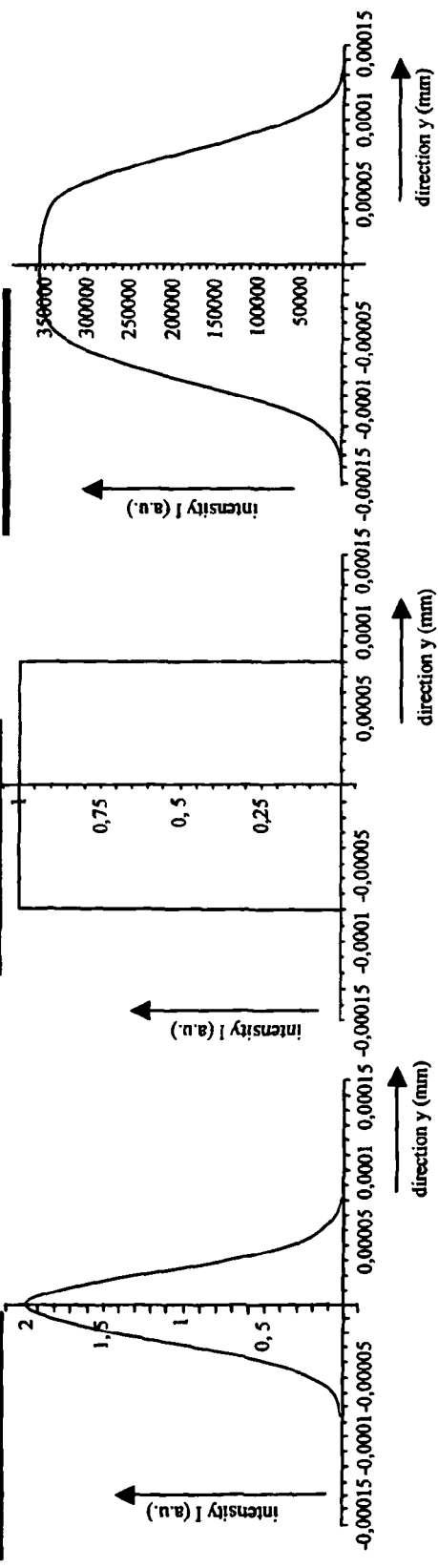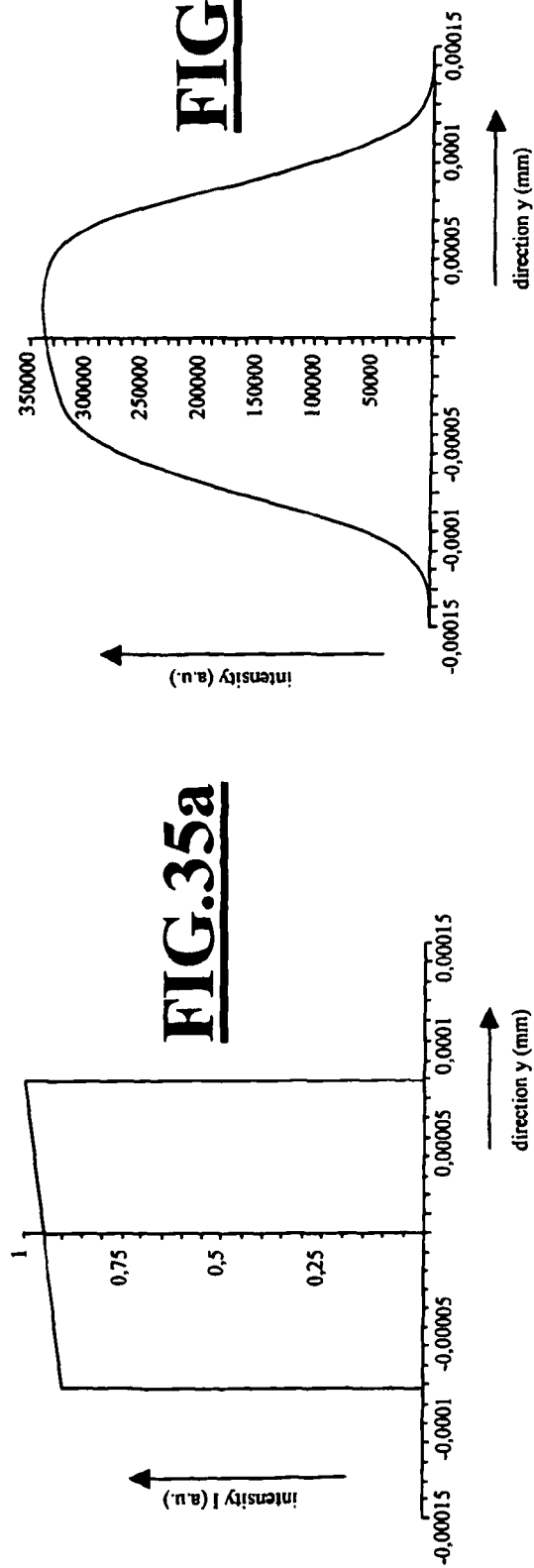

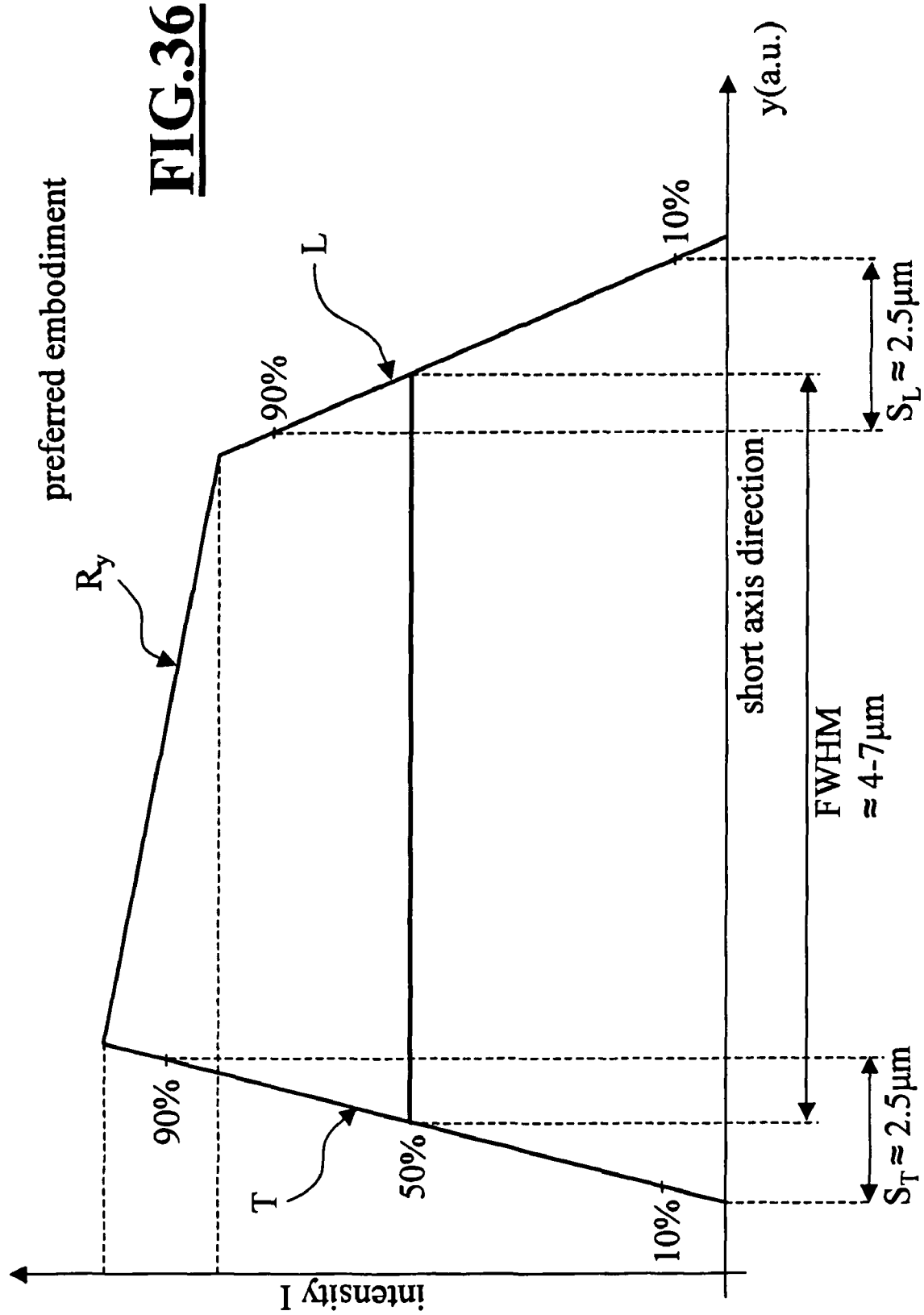

OPTICAL ILLUMINATION SYSTEM FOR CREATING A LINE BEAM

CROSS-REFERENCE TO RELATED APPLICATIONS

Under 35 U.S.C. 119(e)(1), this application claims priority to Provisional Application No. 60/638,263, filed on Dec. 22, 2004. This application is a continuation in part of and claims priority to International Application PCT/EP2005/012879, filed Dec. 2, 2005.

TECHNICAL FIELD

The disclosure relates to an optical system for creating a target intensity distribution in a target field from an input light beam having an intensity distribution.

The disclosure also relates to a material processing apparatus, in particular to a laser annealing apparatus.

BACKGROUND

Lasers are used to anneal amorphous silicon (a-Si) to form polycrystalline silicon (p-Si). The conversion of a-Si into p-Si may be employed by heat treatment at around 1000° C. Such a procedure may only be used for a-Si on heat resistant substrates such as quartz. Such materials are expensive compared to normal float glass for display purposes. Light induced crystallization of a-Si allows the formation of p-Si from a-Si without destroying the substrate by the thermal load during crystallization. Amorphous Silicon may be deposited by a low cost process such as sputtering or chemical vapour deposition (CVD) on substrates such as glass, quartz or synthetics. The crystallization procedures are well known as excimer laser crystallization (ELC), sequential lateral solidification (SLS) or thin beam crystallization procedure (TDX). An overview of these different fabrication procedures is e.g. given by D. S. Knowles et al. "Thin Beam Crystallization Method: A New Laser Annealing Tool with Lower Cost and Higher Yield for LTPS Panels" in SID 00 Digest, 1-3; Ji-Yong Park et al. "P-60: Thin Laser Beam Crystallization method for SOP and OLED application" in SID 05 Digest, 1-3 in a brochure of the TCZ GmbH Company entitled "LCD Panel Manufacturing Moves to the next Level-Thin-Beam Directional 'Xtallization (TDX) Improves Yield, Quality and Throughput for Processing Poly-Silicon LCDs".

Line beams with a typical size of e.g. 0.5 mm×300 mm and a homogeneous intensity distribution are for example applied in silicon annealing on large substrates using excimer lasers (ELC). State-of-the-art optical systems use refractive optical illumination systems containing crossed cylindrical lens arrays to create the desired intensity distribution. These arrays, the functionality of which is e.g. described in US 2003/0202251 A1, are examples of a more general group of homogenization schemes that divide the input beam into multiple beams using suitably shaped sub apertures. The superposition of these multiple beams in the field plane averages out intensity variations and homogenizes the beam.

Typically, two perpendicular directions are homogenized separately using cylindrical optics. The main element for each direction is a cylindrical lens array which creates a certain homogeneous angular spread. This means that for each of said direction one of said cylindrical lens arrays is optically relevant for creating said certain homogeneous angular spread. FIG. 1 shows a cross section along one of said perpendicular directions of a state-of-the-art homogenizing optical system 1 containing crossed cylindrical lens arrays. For facility reasons FIG. 1 does only show the cylindrical lens array 2 (comprising in the present case n=3 lenslets 2a, 2b, 2c) which creates said certain homogeneous angular spread (divergence) from said input beam 4 in said direction drawn (first axis direction) and indicated with an arrow 3. The range of angles 5 from each array 2 is mapped to the focal plane 6 of a subsequent condensor lens 7 to yield a homogeneous illumination 8.

The field size $s_f$ is determined by the spacing d of the first array 2 and the focal lengths $f_{condensor}$, $f_{array}$ of the lenses 2, 7 according to the following equation:

$$s_f = d * f_{condensor}/f_{array} \quad (1)$$

The other axis of the beam is homogenized using the same technique, although other focal lengths and/or array spacings are required to obtain the desired field size.

This setup with one array 2 is sensitive to divergence (incoherence) of the incoming beam 4, which blurs the edges of the field 9, and to overcome this a second array 10 (here: n=3 lenslets 10a, 10b, 10c) with identical focal length $f_{array}$ can be placed in the focal plane 11 of a convex field array 2 (e.g. known from Fred M. Dickey and Scott C. Holswade, "Laser Beam Shaping", Marcel Dekker Inc. New York/Basel 2000). This yields the classical cylindrical fly's-eye homogenizer 12 which is shown in FIG. 2.

2. Problem to be Solved

In state-of-the-art systems the width of the line beam is typically some 100 times the width of a diffraction limited beam (for the given numerical aperture of the system). However, for some applications it is desirable to have a very thin (e.g., <0.05 mm) and long (e.g., >300 mm) line focus with a homogeneous intensity distribution. In this case the beam width is close to a small multiple of the diffraction limited beam size. For a Gaussian input beam (which is a good approximation for an excimer laser profile along one dimension) the diffraction limited beam size (measured at $1/e^2$ intensity level) is $$w_{min} = 2\lambda/\pi NA \quad (2)$$

wherein $\lambda$ is the laser wavelength and NA the numerical aperture of the system (measured at $1/e^2$ intensity level of the input beam). Typical values from laser material processing are NA=0.15, and $\lambda$=308 nm giving a diffraction limited beam size $w_{min}$ of approximately 1.3 µm.

Small beam widths close to this diffraction limit can not be realized with state-of-the-art homogenization using cylindrical lens arrays. A lens array divides the beam into n beams with n-times smaller width. This effectively reduces the available numerical aperture $NA_{lenslet}$ for each beam to 1/n of the numerical aperture NA of the system:

$$NA_{lenslet} = NA/n \quad (3)$$

The minimum field size that can be achieved is limited by this $NA_{lenslet}$ of the individual lenslets. It is well known that diffraction effects dominate the resulting beam for small beam sizes. For example for n=10 and the parameters as above, the best homogeneity of the intensity distribution one can expect from a two-stage homogenizer 12 as shown in FIG. 2 when trying to create a 10 µm field looks like the intensity distribution shown in FIG. 3 which is based on a fourier optics calculation. This rather inhomogeneous intensity distribution results from an at least almost incoherent superpostion of the partial beam profiles in y-direction.

In practice, the result is further distorted by speckles due to interference between the beams from different lenslets (again known from Fred M. Dickey and Scott C. Holswade, "Laser Beam Shaping", Marcel Dekker Inc. New York/Basel 2000). Also, two-stage homogenizers are difficult to realize for small field sizes because $f_{array}$ and thus the separation of the arrays need to be very large.

A homogenizer which uses a single array is easier to realize, but as stated above, it is sensitive to divergence of the incoming beam, which effectively further increases the width of the intensity distribution in the field plane. This is a problem especially for excimer lasers, where the minimum beam width that can be realized by focusing the beam is r-times the diffraction limited line width $w_{min}$, where r typically is a number between 5 and 20.

This means that with state-of-the-art solutions, very narrow intensity distributions can not be realized. It is necessary to design for a significantly larger field and use only the central part of it, (which is for example taught by Burghardt et al. in U.S. Pat. No. 5,721,416), which means that most of the light is not directed to the desired field area. The problem is to find a method and an apparatus to create a narrow, homogeneous intensity distribution with a small slope width which significantly reduces the laser power that is required.

SUMMARY

It is an object of the present invention to provide an optical system for creating a target intensity distribution in a target field from an input light beam having an input intensity distribution, whereby the target intensity distribution is homogenized in two, preferably perpendicular, directions.

It is a further object of the present invention to provide an optical system for creating a narrow, homogeneous target intensity distribution with a small slope width in a target field from an input light beam whereby the ratio of light input power to output light power is reduced significantly as compared with state-of-the-art optical systems where a high fraction of the light is not directed to the desired field area and e.g. blocked by a field stop.

It is another object of the present invention to provide an optical system for creating a target intensity distribution in a target field from an input light beam having an input intensity distribution which renders it possible to adjust the target intensity distribution and in particular to adjust the width of an output line beam having a width and a length with an extension of more than several hundreds of the width.

It is another object of the present invention to provide a material processing apparatus, a laser annealing apparatus and an apparatus to induce crystallization of semiconductor layers, such as for example amorphous silicon layers, which achieve the objects mentioned before.

These and other objects are achieved by an optical system having the features of claims 1 to 22 and 25 to 94, by a material processing apparatus having the features of claim 23 and a laser annealing apparatus having the features of claim 24.

These and other objects are achieved according to a first aspect of the present invention by an optical system to create from a beam of light an intensity distribution on a surface, whereby the optical system comprises at least a first optical element which splits the incident beam into a plurality of beams some of which at least partially overlap in a first direction on said surface and whereby the optical system further comprises at least a second optical element which displaces at least one of said beams in a second direction on said surface.

According to another aspect of the present invention, an optical system for creating a target intensity distribution on a surface from an input light beam having an input intensity distribution is provided, comprising a light source emitting said input light beam propagating in a propagation direction, said input light beam having an extension in a first dimension transverse to the propagation direction and an extension in a second dimension transverse to said first dimension and to said propagation direction, at least one beam splitting optical element for splitting said input light beam into a plurality of beams some of which at least partially overlap in said first dimension on said surface, at least one beam displacing optical element for displacing at least one of said plurality of beams in said second dimension on said surface.

According to a further aspect of the present invention, an optical system for creating a target intensity distribution on a surface from an input light beam having an input intensity distribution is provided, comprising a light source emitting said input light beam propagating in a propagation direction, said input light beam having an extension in a first dimension transverse to the propagation direction and an extension in a second dimension transverse to said first dimension and to said propagation direction, at least one beam splitting optical element for splitting said input light beam into a plurality of beams some of which at least partially overlap in said first dimension on said surface, at least one beam displacing optical element for displacing at least a first of said plurality of beams with respect to a second of said plurality of beams in said second dimension by a fraction of the extension of said first or said second of said plurality of beams in said second dimension on said surface.

According to still another aspect of the present invention, an optical system for creating a target intensity distribution on a surface from an input light beam having an input intensity distribution is provided, comprising a light source emitting said input light beam propagating in a propagation direction, said input light beam having an extension in a first dimension transverse to the propagation direction and an extension in a second dimension transverse to said first dimension and to said propagation direction, at least one beam homogenizing optical element for homogenizing said input light beam in said first and/or said second dimension creating a homogenized intensity distribution in an area on said surface where the uniformity error is less than 15% and where the expansion Ty in said first or said second dimension holds the following relation: $0.6 < T_y/FWHM < 0.85$, wherein FWHM is the full width at half maximum of said target intensity distribution in said first or said second dimension, respectively. For a Gaussian beam distribution the value for $T_y/FWHM$ is 0.48. The effect of the homogenization is to increase this value.

According to another aspect of the invention, an optical system for creating a target intensity distribution on a surface from an input light beam having an input intensity distribution is provided, comprising a light source emitting said input light beam propagating in a propagation direction, said input light beam having an extension in a first dimension transverse to the propagation direction and an extension in a second dimension transverse to said first dimension and to said propagation direction, at least one beam homogenizing and ramp generating optical element for homogenizing said input light beam in said first and/or said second dimension and for generating a linear intensity ramp in said first and/or said second dimension creating a homogenized and ramped intensity distribution in an area on said surface having an expansion $R_y$ in said first or said second dimension where the target intensity is more than 85% of a maximum target intensity and where the expansion $R_y$ of said ramp in said first or said second dimension holds the following relation: $0.6 < R_y/FWHM < 0.85$, wherein FWHM is the full width at half maximum of said target intensity distribution in said first or said second dimension, respectively.

Another aspect of the invention focuses on an optical system for creating a target intensity distribution on a surface from an input light beam having an input intensity distribution and propagating in a propagation direction, wherein said input light beam having an extension in a first dimension transverse to the propagation direction and an extension in a second dimension transverse to said first dimension and to said propagation direction and comprising a beam homogenizing element for homogenizing said input light beam in said first dimension and said second dimension such that said target intensity distribution has an extension in said second dimension with a maximum full width at half maximum of less than 20 µm.

Still another aspect of the invention concerns an optical system for creating, from a laser light source, a homogeneous target intensity distribution of a central area with less than 15% uniformity deviation from a maximum intensity value, whereby the central area has a length of larger than 300 mm and a width of smaller than 50 µm, whereby more than 30% of the laser light emitted by the laser light source is within said central area.

A further aspect of the invention concerns an optical system for creating a homogeneous target intensity distribution of a central area with less than 15% uniformity deviation from a maximum intensity value, whereby the central area has a length of larger than 100 mm in a first dimension and a width of smaller than 100 µm in a second dimension. The optical system according to the invention comprises a lens with a refractive power in a first and/or a second direction, whereby said lens is rotated by a rotation angle around a rotation axis coinciding with an optical axis being perpendicular to said first and second direction, wherein said rotation angle is the angle between a symmetry axis of said lens, for example of an apex line of a convex or a concave cylindrical lens (which preferably determines the refractive power in said first and/or said second direction), and said first or said second dimension of said target intensity distribution, whereby said rotation angle is larger than 0.2°. The value 0.2° lies well above non-adjustments in typical illumination systems. Preferably, the rotation angle is the angle between said first or said second direction determining the direction of said refractive power.

It is still another aspect of the present invention to provide an optical system for creating a homogeneous target intensity distribution of a central area with less than 15% uniformity deviation from a maximum intensity value, whereby the central area has a length in a first dimension of larger than 100 mm and a width of smaller than 100 µm in a second dimension. The optical system comprises a mirror with a reflective power in a first and/or a second direction, whereby said mirror is rotated by a rotation angle around a rotation axis, wherein said rotation angle is the angle between a symmetry axis of said mirror, for example of an apex line of a convex or a concave cylindrical lens (which preferably determines the reflective power in said first and/or said second direction), and said first or said second dimension of said target intensity distribution, whereby said rotation angle is larger than 0.2°. Preferably, the rotation angle is the angle between said first or said second direction determining the direction of said reflective power. Most preferably, said rotation axis does not coincide with the optical axis.

Still a further aspect of the invention provides an optical system for creating a homogeneous target intensity distribution of a central area with less than 15% uniformity deviation from a maximum intensity value, whereby the central area has a length of larger than 100 mm and a width of smaller than 100 µm. The optical system comprises a lens array comprising lenses having a reflective or refractive power in a first direction, whereby at least one of said lenses is displaced to at least a second of said lenses in said first direction.

At last another aspect of the invention concerns an optical system for homogenizing an input light beam propagating in a propagation direction comprising a distributed delay device optical element being arranged in a pupil plane of said optical element.

According to still a further aspect of the invention, a material processing apparatus, a laser annealing apparatus and an apparatus to induce crystallization of semiconductor layers, such as for example amorphous silicon layers, are provided comprising an optical system for creating a target intensity distribution on a surface from an input light beam having an input intensity distribution as outlined above.

According to a further aspect, the invention features an optical assembly. The optical assembly includes a plurality of optical elements arranged to receive a beam of radiation and form an illumination pattern at a field plane. The illumination pattern includes a portion having a maximum dimension along a first axis of about 100 µm or less and a minimum dimension along a second axis of about 50 mm or more, where the first axis is orthogonal to the second axis and where an intensity of the radiation in the portion varies by no more than about 10% across the area of the portion.

Embodiments of the optical assembly can include one or more of the following features. For example, the intensity of the radiation in the portion can vary by no more than about 8% (e.g., no more than about 5%, no more than about 4%, no more than about 3%, no more than about 2%, no more than about 1%) across the area of the portion.

The maximum dimension along the first axis can be about 50 µm or less (e.g., about 40 µm or less, about 30 µm or less, about 25 µm or less, about 20 µm or less, about 15 µm or less, about 12 µm or less, about 10 µm or less, about 8 µm or less, about 5 µm or less).

The minimum dimension along the second axis can be about 200 mm or more (e.g., about 300 mm or more, about 400 mm or more, about 500 mm or more, about 600 mm or more, about 700 mm or more, about 800 mm or more).

According to another aspect, the invention features a system that includes a laser configured to produce a beam of radiation, a mount configured to support a substrate and to position the substrate relative to the laser, and an optical assembly positioned to receive the beam from the laser and to illuminate an area of a surface of the substrate with the radiation. The illuminated area has a maximum dimension along a first axis of about 100 µm or less and a minimum dimension along a second axis of about 50 mm or more, where the first axis is orthogonal to the second axis and an intensity of the radiation varies by no more than about 10% across the area.

Embodiments of the system can include one or more of the following features. The optical assembly can be the aforementioned optical assembly. The optical assembly can include a first optical element configured to split the beam into two or more secondary beams. The paths of the two or more secondary beams can be displaced from one another along a first direction. The two or more secondary beams can at least partially overlap with at least one other secondary beam at the surface of the substrate.

The radiation can have a wavelength of about 400 nm or less (e.g., about 375 nm or less, about 360 nm or less, about 350 nm or less, about 340 nm or less, about 330 nm or less, about 320 nm or less, about 310 nm or less, about 300 nm or less, about 290 nm or less, about 280 nm or less, about 270 nm or less, about 260 nm or less, about 250 nm or less). The beam can have a power of about 100 W or more (e.g., about 200 W or more, about 300 W or more, about 400 W or more, about 500 W or more, about 600 W or more, about 700 W or more, about 800 W or more, about 900 W or more, about 1,000 W or more).

The laser can be an eximer laser. The laser can be a pulsed laser.

According to another aspect, the invention features a method that includes illuminating a substrate with radiation from a laser, the laser having an output power of about 100 W or more, wherein the radiation illuminates an area on a surface of the substrate having a maximum dimension along a first axis of about 100 µm or less and a minimum dimension along a second axis of about 50 mm or more, where the first axis is orthogonal to the second axis. The method also includes disposing a layer of a first material on the surface of the substrate and combining the substrate with one or more other components to form a flat panel display.

Implementations of the method can be performed using the aforementioned system and/or the aforementioned optical assembly. Implementations of the method can include any of the following features. For example, illuminating the substrate can include splitting a primary beam of radiation from the laser into a plurality of secondary beams, wherein adjacent secondary beams at least partially overlap on the surface of the substrate. Slitting the primary beam can include focusing different a first portion of the primary beam to a first location, and focusing a second portion of the primary beam to a second location, wherein the first and second portions are different and the first and second locations are different.

Illuminating the substrate can include moving the substrate relative to the laser to expose a multiple portions of the substrate surface to radiation from the laser. The relative motion between the substrate and the laser can be substantially parallel to the first axis. The substrate can be moved relative to the laser at a rate of about 1 mm/second or more (e.g., about 2 mm/second or more, about 3 mm/second or more, about 4 mm/second or more, about 5 mm/second or more, about 6 mm/second or more, about 7 mm/second or more, about 8 mm/second or more, about 9 mm/second or more, about 10 mm/second or more, about 11 mm/second or more, about 12 mm/second or more, about 13 mm/second or more, about 14 mm/second or more, about 15 mm/second or more, about 20 mm/second or more).

Illuminating the substrate can include exposing the area of the substrate surface to one or more pulses of radiation from the laser. Each radiation pulse can have an energy of about 100 mJ or more (e.g., about 150 mJ or more, about 200 mJ or more, about 250 mJ or more, about 300 mJ or more, about 400 mJ or more, about 450 mJ or more, about 500 mJ or more). The pulses can have a frequency of about 1 kHz or more (e.g., about 2 kHz or more, about 3 kHz or more, about 4 kHz or more, about 5 kHz or more, about 6 kHz or more, about 7 kHz or more, about 8 kHz or more, about 9 kHz or more, about 10 kHz or more).

The first material can be a liquid crystal material. The first material can form an organic light emitting layer on the substrate. The substrate can include a glass layer. The substrate can include a silicon layer. The substrate can include a layer of a second material, where the radiation anneals a portion of the second material exposed to the radiation. The second material can be silicon.

The flat panel display can be a liquid crystal display (LCD). The flat panel display can be an Organic Light Emissive Device (OLED) display.

Among other advantages, embodiments may be useful, for example, in annealing of large substrates, in the field of light (e.g. laser) induced crystallization of substrates, in the field of flat panel display, such as liquid crystal display (LCD) (for example: thin film transistor displays (TFT) etc.) or luminescence display (anorganic or organic light emitting diode (LED, OLED), electroluminescence (EL)) manufacturing processes. Furthermore, the present invention may be used for the fabrication of thin film photovoltaic devices.

In particular, embodiments may be useful in order to crystallize amorphous Silicon (a-Si) films forming polycrystalline Silicon (p-Si). Such polycrystalline Silicon thin films are widely used in microelectronics and display techniques as mentioned above. P-Si has a higher charge carrier mobility as compared to a-Si which is useful for the fabrication of higher speed switching or integration of higher quality driver electronics on the display substrate. Furthermore, p-Si has a lower absorption coefficient for light in the visual spectral range enabling p-Si to be used as a rear electrode for LCD-applications allowing backlight to be transmitted. Lastly, the defect density of p-Si is lower as compared with a-Si which is a prerequisite for the fabrication of high efficient solar cells.

BRIEF DESCRIPTION OF THE DRAWINGS

Embodiments are shown in the drawings and will be described hereinafter in more detail with reference to the drawings. Identical or functionally similar components are identified with the same reference numbers. In the drawings:

FIG. 29a is a calculated input beam intensity profile at the field plane assuming a Gaussian distribution;

FIG. 29b is a calculated top-hat profile at the field plane by using a rotated cylindrical lens according to FIG. 28a and not taking into account the divergence of the laser;

FIG. 29c is a calculated output beam intensity profile assuming an input beam according to FIG. 29a having passed the optical system according to FIGS. 27, 28c, 28d;

FIG. 29d is a calculated top-hat intensity profile at the field plane assuming a Gaussian distribution;

FIG. 29e is a calculated ramp intensity profile at the field plane by using a rotated cylindrical lens and a clipping blade according to FIGS. 28b, 28f and not taking into account the divergence of the laser emitting said input beam;

FIG. 29f is a calculated output beam intensity profile assuming an input beam according to FIG. 29a having passed the optical system according to FIGS. 27, 28c, 28d but having the beam clipped at the entrance of the rotated cylindrical lens as shown in FIG. 28b;

FIG. 30a is a plane view in the yz-plane of an alternative to the seventh embodiment of an optical system according to the invention;

FIG. 30b is a target intensity distribution along the short axis direction when using the embodiment according to FIG. 30a;

FIG. 31a is a plane view in the xz-plane of the eighth embodiment of an optical system according to the invention;

FIG. 31b is a plane view in the yz-plane of the eighth embodiment of an optical system according to FIG. 31a;

FIG. 34a is a calculated input beam intensity profile assuming a Gaussian distribution;

FIG. 34b is a calculated top-hat profile at the field plane by using a rotated cylindrical lens according to FIG. 28a and not taking into account the divergence of the laser;

FIG. 34c is a calculated output beam intensity profile assuming an input beam according to FIG. 34a having passed the optical system according to FIGS. 30 and 31;

FIG. 35a is a calculated ramp profile at the field plane by using a rotated cylindrical lens according to FIG. 33 and a clipping blade similar to that shown in FIGS. 28b, 28f and not taking into account the divergence of the laser emitting said input light beam;

FIG. 35b is a calculated output beam intensity profile assuming an input beam according to FIG. 34a having passed the optical system according to FIGS. 30 and 31 but having the beam clipped at the entrance of the rotated cylindrical lens as shown in FIG. 33;

FIG. 36 is a schematic drawing of the intensity distribution along the short axis of an output beam having a cross section with a first dimension and a second dimension, whereby the first dimension exceeds the second dimension several hundreds fold.

DETAILED DESCRIPTION

As discussed previously, the homogenization with cylindrical lens arrays is not necessarily suitable for creating a very narrow, homogeneously illuminated field with a small edge width. The problems with state-of-the-art homogenizers arise from the splitting of the beam into multiple beams along the direction in which the narrow field is to be created (from now on called the "short" direction $A_s$), which effectively reduces the numerical aperture and increases the diffraction-limited beam size.

The key to a solution is to homogenize the beam only in the "long" direction $A_l$ using cylindrical lens array(s) and to avoid the splitting of the beam in the short direction $A_s$ to keep the numerical aperture NA high and the diffraction-limited beam size small. The multiple beams from the long axis array(s) are used to achieve homogenization along both axes $A_s$, $A_l$ of the beam.

Some applications or uses do not necessarily require that "exclusively" a splitting of the input beam takes place in the long direction $A_l$ and "any" splitting of the input beam in the short direction $A_s$ is avoided. Some applications may allow to split the input beam additionally in the short direction $A_s$ (but preferably only for a few times) dependent on the input light source used and/or dependent on the width of the beam to be generated. For example a beam width of about 20 µm may be achieved by splitting of the input beam of an excimer-laser for 2 or 3 times, while this width may also be achieved by splitting of the input beam of a solid state laser for 5 to 20 times.

Figure 1:
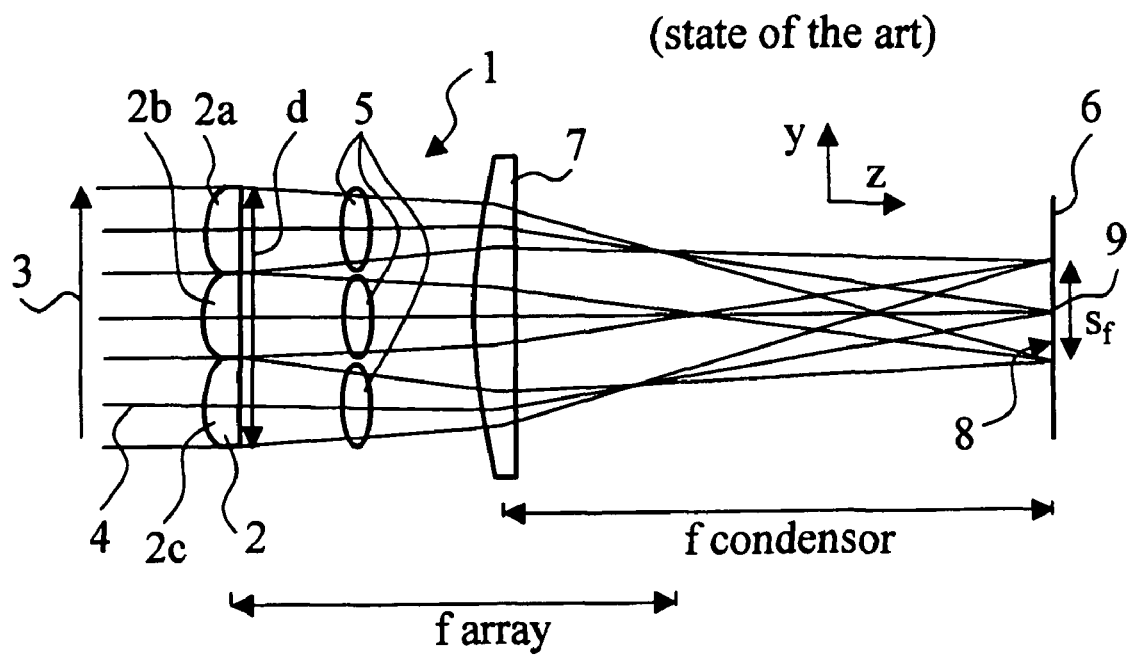
FIG. 1 is a plane view in the yz-plane of a first embodiment of a homogenizing optical element according to the prior art.
Figure 2:
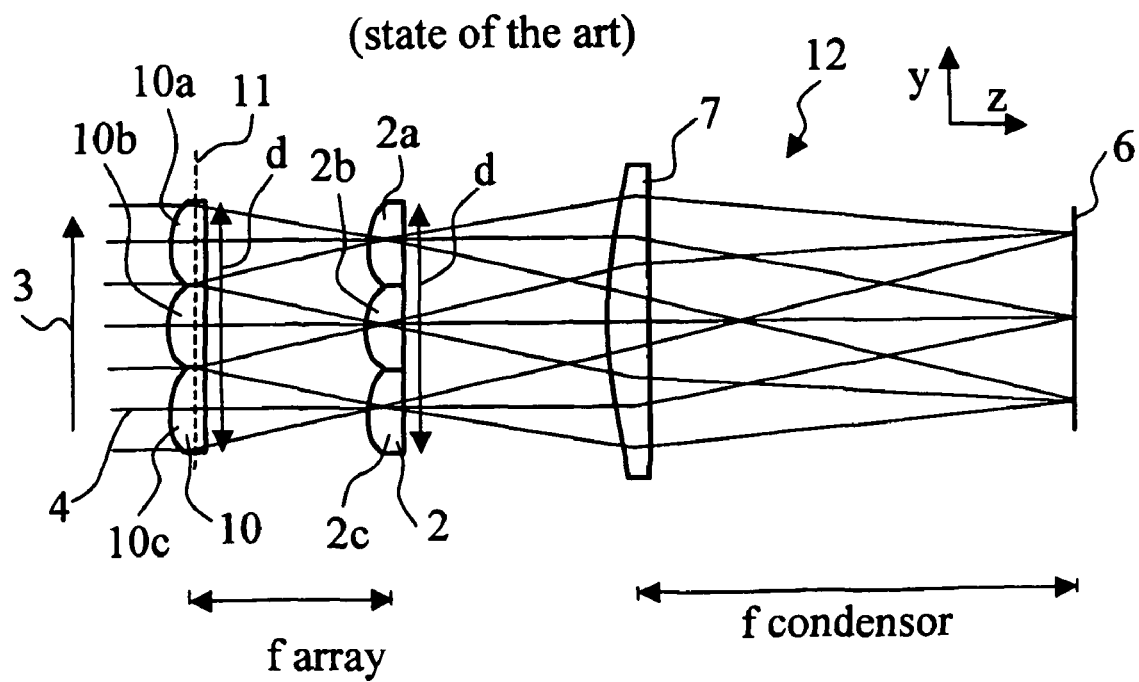
FIG. 2 is a plane view in the yz-plane of a second embodiment of a homogenizing optical element according to the prior art.
Figure 3:
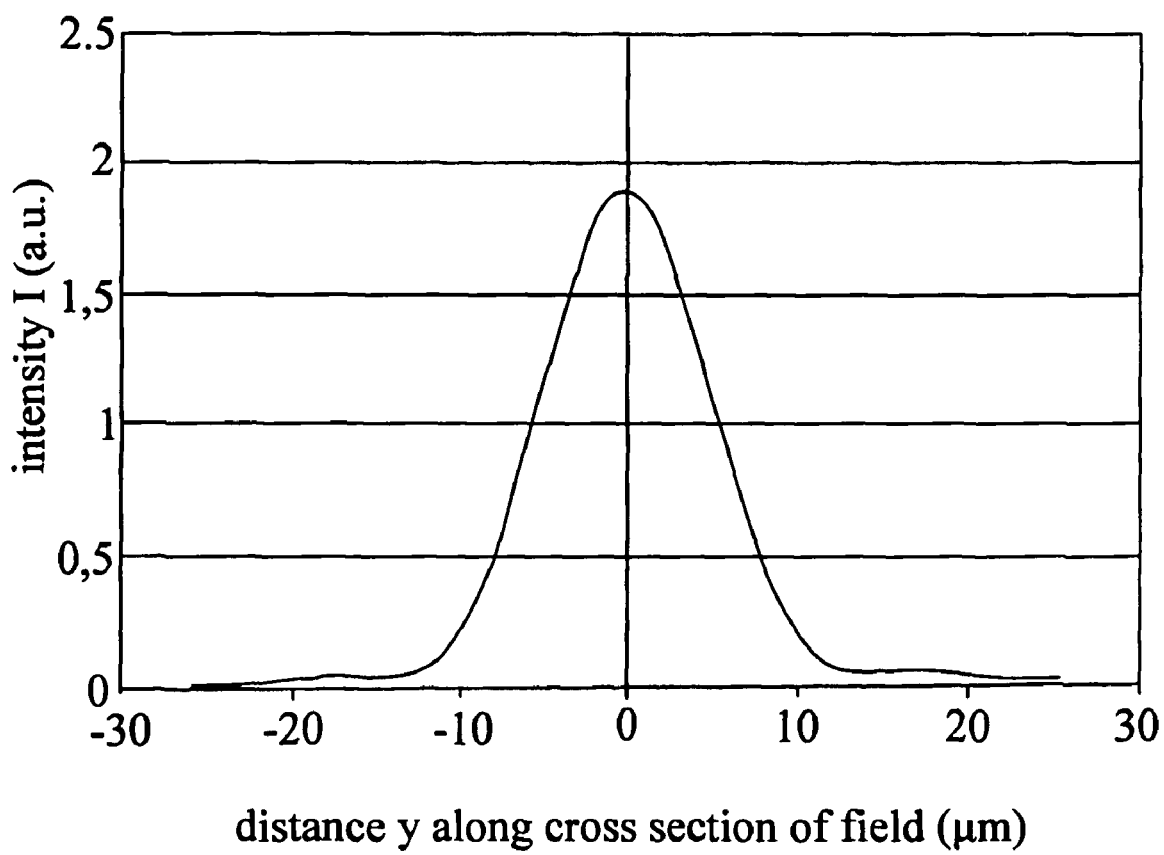
FIG. 3 is a calculated intensity distribution one can expect from a two-stage homogenizer as shown in FIG. 2 when trying to create a 10 µm field.
Figure 4:
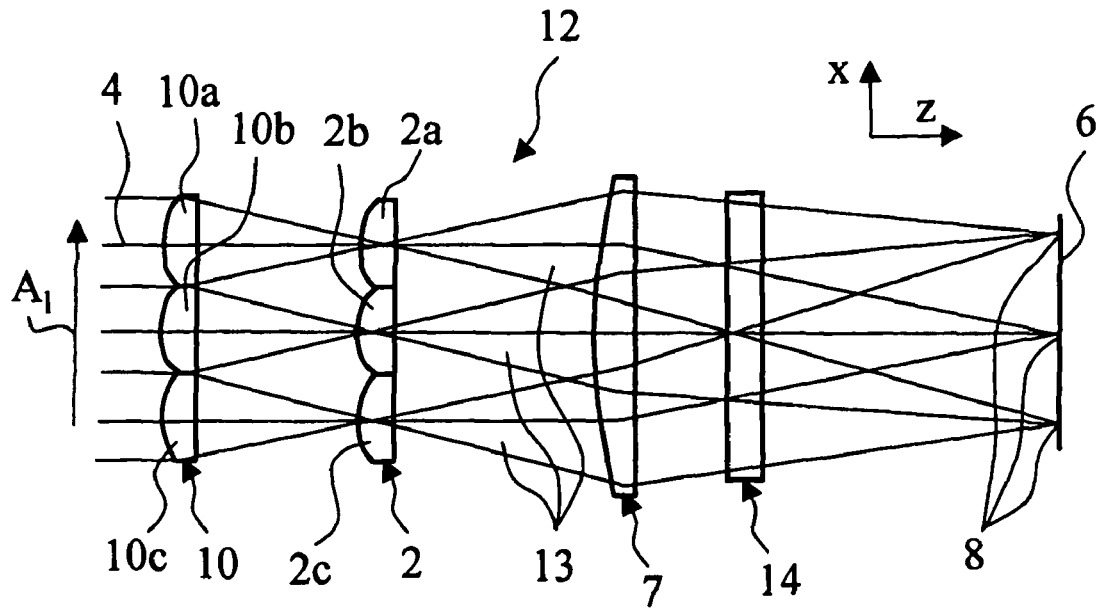
FIG. 4 is a plane view in the xz-plane of a third embodiment of a homogenizing optical element according to the prior art.
Figure 5:
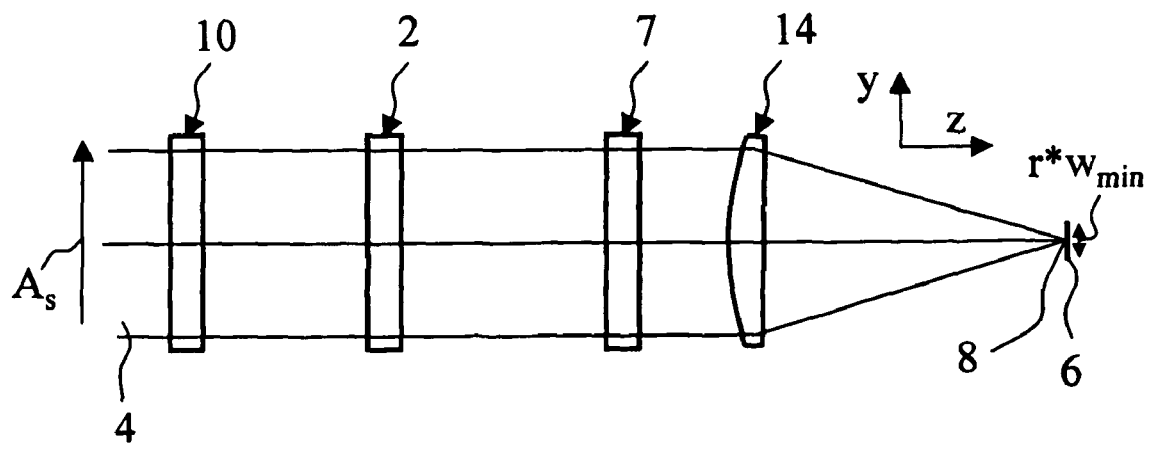
FIG. 5 is a plane view in the yz-plane of the third embodiment of a homogenizing optical element according to the prior art shown in FIG. 4.

The homogenizing of an input beam exclusively in the "long" direction $A_l$ using cylindrical lens array(s) and avoiding any splitting of the beam in the "short" direction $A_s$ is demonstrated exemplary in the following referring to FIGS. 4 and 5. FIG. 4 shows a plane view in the xz-plane of a third embodiment of a homogenizing optical element according to the prior art. FIG. 5 shows the corresponding plane view in the yz-plane of the third embodiment shown in FIG. 4. As a homogenizing optical element a two-stage homogenizer 12 as already shown in FIG. 2 is used. A single stage homogenizer (as, e.g., shown in FIG. 1) or any other single or multiple stage homogenizer may be used.

A light source (not shown) emits an input light beam 4 propagating in a propagation direction z. Said input light beam 4 has an extension in a first dimension x transverse to the propagation direction z and an extension in a second dimension y transverse to said first dimension x and to said propagation direction z. The light source may be for example a laser, preferably operating at a wavelength below 600 nm, such as e.g. an excimer laser emitting at 351 nm or 308 nm, respectively (for example a KrF-excimer laser, a XeCl-excimer laser, a XeF-excimer laser).

The cylindrical array(s) 2, 10 for the long axis $A_l$ homogenization create(s) m individual beams 13 (FIG. 4 shows m=3 individual beams 13) which are all superimposed in the field plane 6. Together with a focusing lens 14 in the short axis, this results in a beam 8 which is homogeneous along the long axis $A_l$ and as small as possible in the short axis $A_s$. The focusing lens 14 can be placed anywhere in before, between or behind the optical elements 2, 10, 7 for the long axis $A_l$ homogenization.

In the field plane, the typical profile in the short axis $A_s$ has a near-Gaussian shape and a width of $r*w_{min}$. For a Gaussian input beam 4 with typical parameters $NA_{imaging}$=0.15 (measured at $1/e^2$ intensity level)

Figure 6:
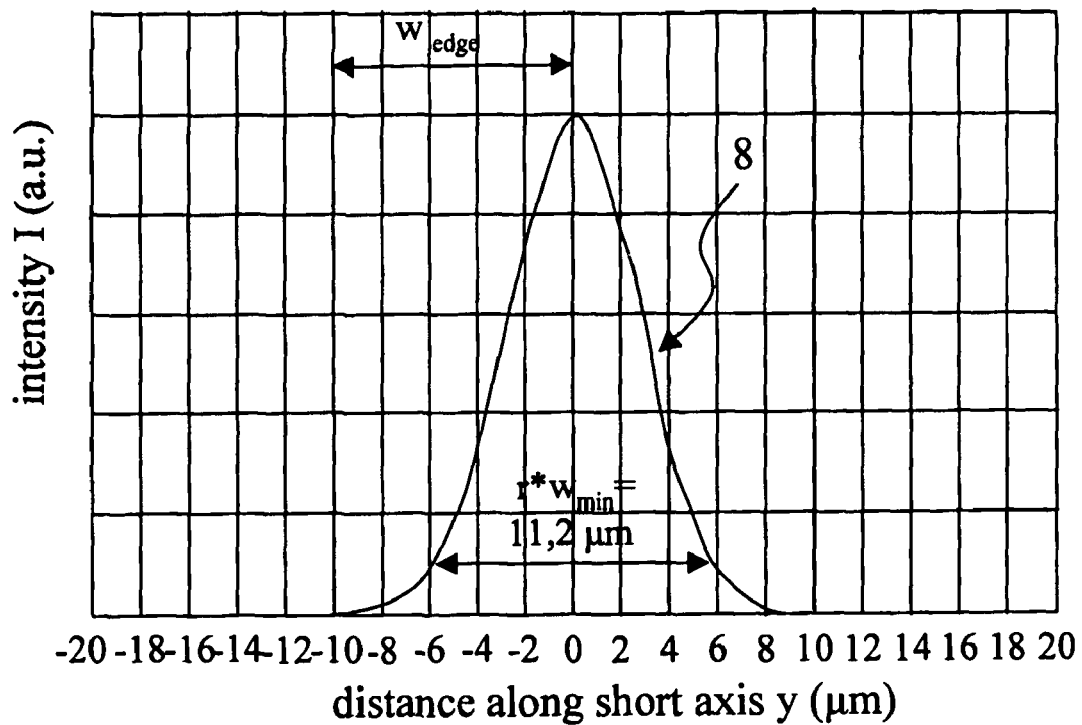
FIG. 6 is a typical intensity profile in a field plane along a first dimension using an excimer laser with a near Gaussian beam shape having a numerical aperture of 0.15 and a wavelength of 308 nm and a width of 8.5 times the diffraction limited beam size of a Gaussian beam.

$\lambda$=308 nm r=8.5 wherein $NA_{imaging}$ is the numerical aperture of the imaging system and $\lambda$ is the wavelength of the input beam 4, the short axis $A_s$ width $r*w_{min}$ of the beam 8 in the field 6 is 11.2 µm (at $1/e^2$ intensity level) as is shown in FIG. 6.

Figure 7:
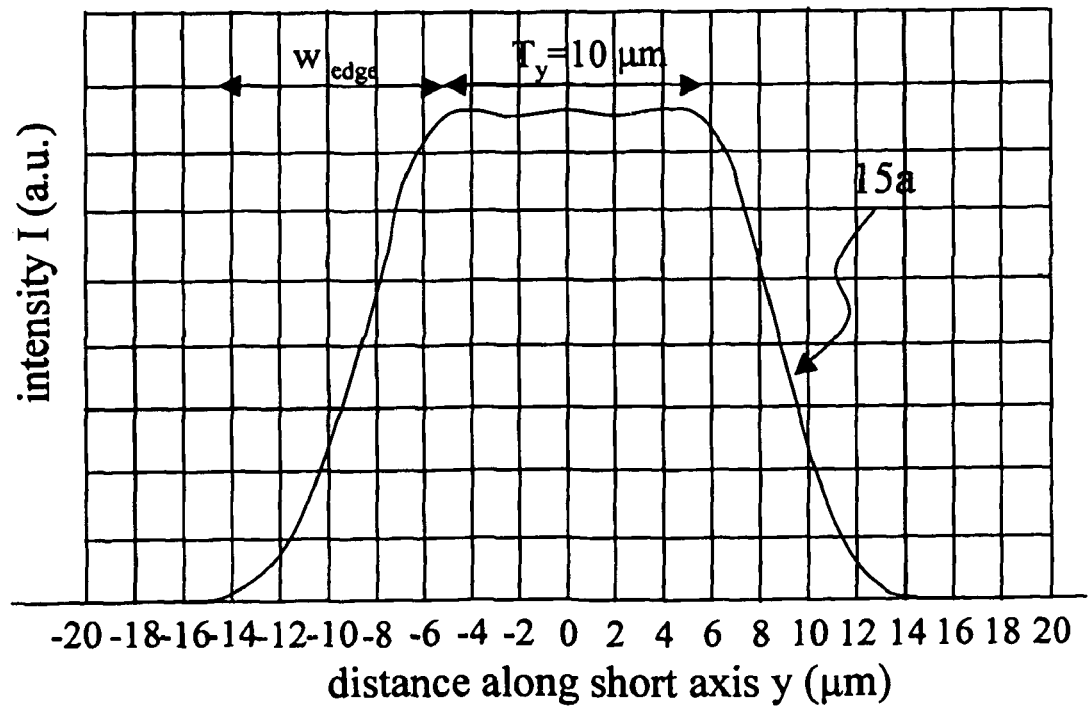
FIG. 7 is a calculated intensity distribution in the field plane one can expect from a two-stage homogenizer as shown in FIGS. 4 and 5 having an numerical aperture of 0.15 when illuminated with a Gaussian input beam with a wavelength of 308 nm and a width of 8.5 times the diffraction limited beam size of a Gaussian beam and laterally displacing ten beams, which are separated along the long axis, in the short axis direction resulting in a top-hat intensity profile with a width of around 10 µm.

Starting from there, a homogeneous distribution along the short axis is generated by laterally displacing the m individual beams 13, resulting in a flat-topped beam 15 with an edge width Wedge that is nearly the same as before the displacement. For m=10 beams 13 with displacements of (6.25, 6.25, 6.25, 2.5, 0, 0, −2.5, −6.25, −6.25, −6.25) µm, the resulting top-hat has a width of $T_y$~10 µm. This beam profile 15*a* is shown in FIG. 7.

Figure 8:
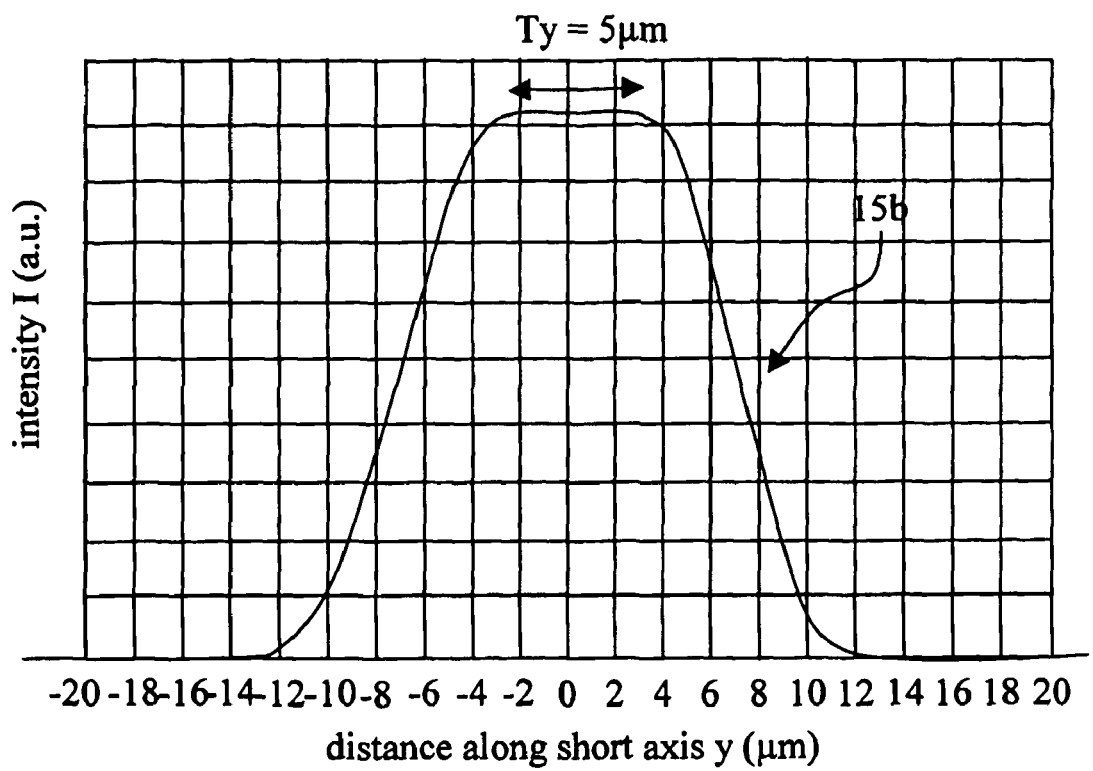
FIG. 8 is a calculated intensity distribution in the field plane one can expect from a two-stage homogenizer as shown in FIGS. 4 and 5 having an numerical aperture of 0.15 when illuminated with a Gaussian input beam with a wavelength of 308 nm and a width of 8.5 times the diffraction limited beam size of a Gaussian beam and laterally displacing ten beams, which are separated along the long axis, in the short axis direction resulting in a top-hat with a width of around 5 µm.

This top-hat can be clipped with a field stop (not shown in FIGS. 4 and 5) and imaged to the final plane (not shown in FIGS. 4 and 5). The energy that is lost amounts to 45.6% for creating a $T_y$=10 µm top-hat, which means that only 15% of the laser power is required as compared to prior art (see BACKGROUND OF THE INVENTION, section 1). The width $T_y$ of the homogeneous section can be adjusted by displacing the beams 13 differently. For m=10 beams 13 with a displacement of (5, 5, 5, 2.25, 0, 0, −2.25, −5, −5, −5) µm, the width $T_y$ of the top hat is ~5 µm. The corresponding beam profile 15*b* is shown in FIG. 8.

Figure 9:
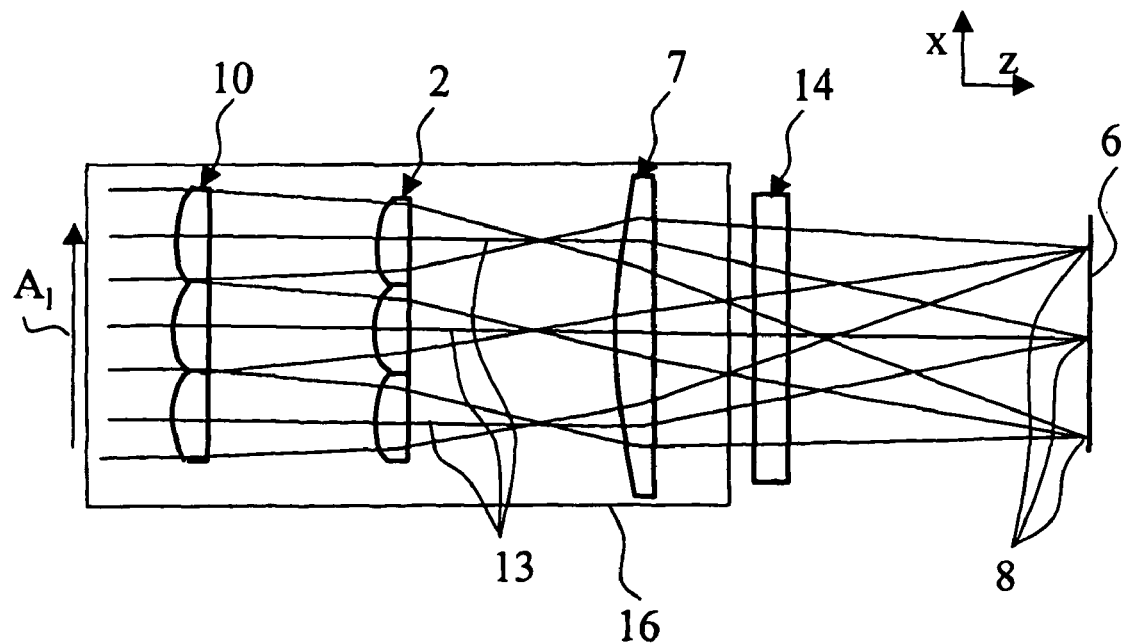
FIG. 9 corresponds to FIG. 2 but additionally indicates the region where the individual beams formed by separating the incoming beam are spatially separated.

The displacement of the m beams in the field can be realized as a slight change of the short axis pointing angle. The deflection has to happen in the region wherein the m individual beams 13 are spatially separated, i.e., in front of or close to the cylindrical lens array(s) for the long axis $A_l$ homogenization (shown as shaded area 16 in FIG. 9).

The lateral displacement of the individual beams 13 in the field plane 6 can be fixed or adjustable. In the first case, it is manufactured into optical elements or mounts e.g. as slightly different wedge angles or rotation angles. In the latter case, it can be either settable once at the initial alignment of the system or fully adjustable using screws, piezo elements, motors, thermal expansion elements, pneumatic cylinders etc.

Figure 10:
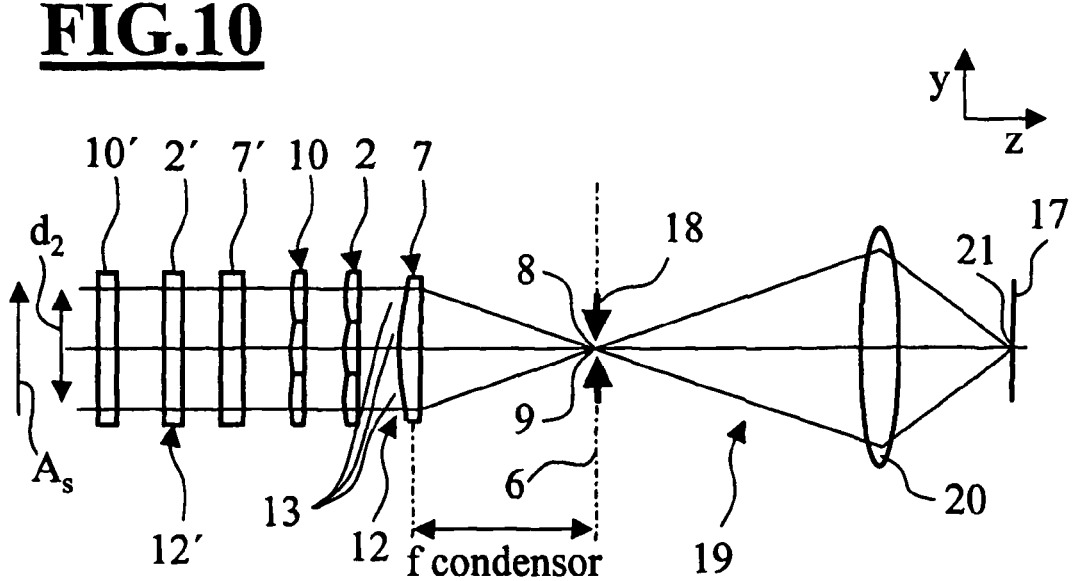
FIG. 10 is a plane view in the yz-plane of an optical system with a two-stage homogenizer and a field stop for generating sharp edges.

If a line beam 21 with sharp edges is required, the field plane 6 of the illuminator 12 can be re-imaged to the final plane 17 and a field stop 18 can be placed at the location 6 of the intermediate field 9 as is e.g. realized by an optical system as shown in FIG. 10.

FIG. 10 shows a plane view in the yz-plane of said optical system. The optical system according to FIG. 10 comprises a two-stage homogenizer 12 based on two cylindrical lens arrays 2, 10 and a condenser lens 7 being arranged in the xy-plane and being optically active in the yz-plane. The optical system further comprises another two-stage homogenizer 12' wherein the cylindrical lens arrays 2', 10' and the condenser lens 7' are arranged in the xy-plane and being optically active in the xz-plane.

The latter homogenizer 12' is intended to carry out a homogenization of an incoming beam in a first dimension, whereas the first homogenizer 12 is intended to achieve a homogenization of said incoming beam in a second dimension being perpendicular to the first dimension. Furthermore, it may be assumed that the expansion of a beam in the first axial dimension exceeds the expansion in the second axis dimension for several (hundreds) fold. Lastly, it may be assumed that the expansion of the homogenized beam in the short axis dimension shall be kept (nearly) as narrow as possible. The latter assumption requires the diffraction in said short axis dimension being low. Therefore, in order to keep the diffraction due to the limited size of the lenses low the number of lenslets in said arrays 2,10 of said two-stage homogenizer 12 should be smaller than 5, preferably smaller than 3. Additionally, FIG. 10 shows a field-stop 18 being arranged in the focal plane 6 of the cylindrical condenser lens 7. On the other side of the field-stop 18, i.e. opposite to the homogenizer 12, an imaging optics 19 is arranged. In the present case the imaging optics 19 comprises a reduction projection lens 20. The image plane 17 of the projection lens 20 forms the final plane 17 as stated above. Furthermore, a beam displacing optical element (not shown) maybe introduced in a region as described above and referring to FIG. 9.

A light source (not shown) emits an input light beam 4 propagating in a propagation direction z. Said input light beam 4 has an extension $d_1$ (not shown) in a first dimension x transverse to the propagation direction z and an extension $d_2$ in a second dimension y transverse to said first dimension x and to said propagation direction z. Said input light beam 4 may originate from a laser, for example an excimer laser such as a KrF excimer laser, a XeCl excimer laser or a XeF excimer laser. The fly-eye homogenizer 12 as well as the another homogenizer 12' split said input light beam 4 into a plurality of individual beams 13 having a divergence. The condenser lens 7 which is arranged in a distance corresponding to the focal lengths $f_{array}$ of the lenslets of the first cylindrical lens array 2 images the individual beams 13 to the (intermediate) field plane 6. Some of said individual beams 13 being separated in said first dimension x at least partially overlap in said first dimension x on said (intermediate) field plane 6. The beam displacing optical element (not shown) which is arranged in a region where the individual beams 13 are separated displaces said plurality of beams in said second dimension y by a fraction of the extension of said plurality of beams in said second dimension on said (intermediate) field plane 6 (see e.g. detailed description with respect to FIGS. 7 and 8).

The imaged beam 8 has a certain extension in said (intermediate) field plane 6, i.e. the field 9 with the field size sf, The field-stop 18 being arranged in said (intermediate) field plane 6 (or close to said field plane 6) has an opening in y-direction which is smaller than the extension of said imaged beam 8 in said (intermediate) field plane 6. Therefore, said field-stop 18 cuts the edges of said imaged beam 8. The projection lens 20 images the field 9 being cut by said field-stop 18 to the final image plane 17 resulting in a line beam 21 with an outer shape being essentially rectangular and having sharp edges in the short axis direction y.

This configuration can be used with all of the proposed solutions and preferred embodiments listed below. For the sake of simplicity, a reduction ratio of 1 will be assumed throughout this document, making the distinction between field stop plane and image plane unnecessary as far as field sizes and numerical apertures are concerned.

If a device to measure the intensity in the plane of the field stop or the image plane is available, e.g., by placing in the beam path or via a pick-off mirror/partial reflector and imaging optics, it is possible to readjust the homogeneity automatically using a feedback algorithm.

This algorithm can work as follows:
calibrate alignment of each beam by moving all beams to one side of the image field/adjustment range and move them through to the other side one after the other, determining what displacement signal corresponds to which actual displacement
move half of the m beams to one edge of the desired field (e.g., +6.25 µm in the above example)
move the other half of the beams to the other edge of the desired field
if m is not even, place the remaining beam at the centre of the desired field
move in beams one by one from each side to fill up the "intensity dip" between the outer peaks.

Once good homogeneity is achieved, it can be fine-tuned by keeping track of the approximate positions of the beams and moving a beam whose position is close to an intensity maximum of the beam towards an adjacent minimum.

In the following, preferred embodiments of an optical system according to the invention are described in detail:

Preferred Embodiment #1

Figure 11:
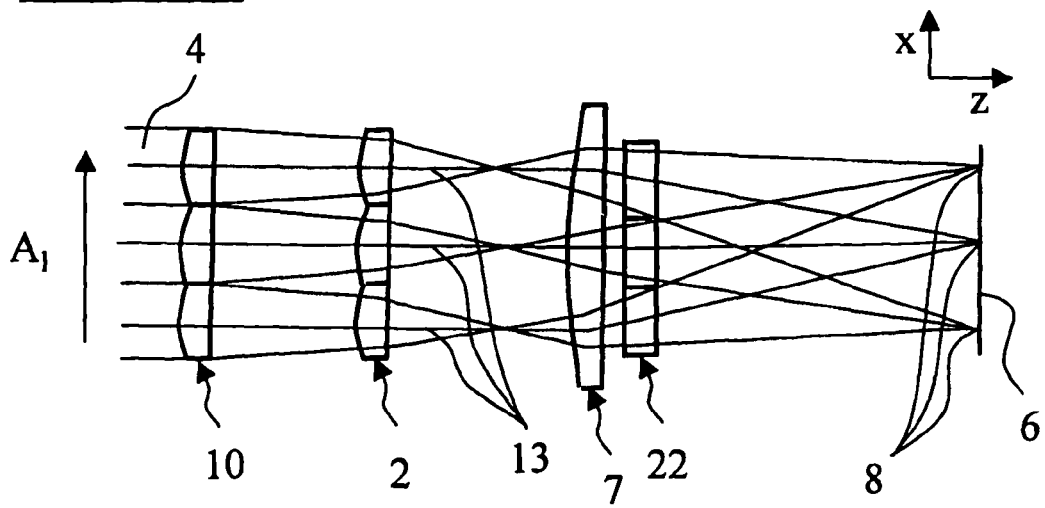
FIG. 11 is a plane view in the xz-plane of a first preferred embodiment of an optical system according to the invention.
Figure 12:
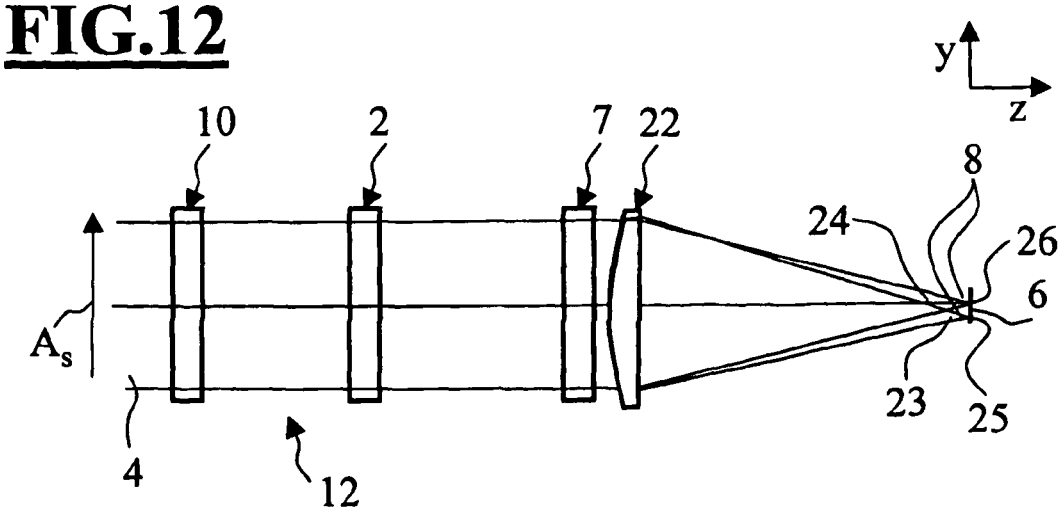
FIG. 12 is a plane view in the yz-plane of the first preferred embodiment of an optical system according to FIG. 11.

FIG. 11 shows a plane view in the xz-plane of a first preferred embodiment of an optical system according to the invention. FIG. 12 is a plane view in the yz-plane of said first preferred embodiment of an optical system according to FIG. 11.

This embodiment #1 comprises two cylindrical lens arrays 2, 10 forming a two-stage fly-eye homogenizer 12 for homogenizing an incoming beam in a first long axis $A_l$ direction x, a convex condenser lens 7 for imaging the individual beams 13 created by the two cylindrical lens arrays 2, 10 to a (field) surface. It has to be noted that this field surface may be an intermediate field surface (from which the field is re-imaged as e.g. described above to a final field surface) or a final field surface. It is further worth mentioning that not only the imaging to a plane may take place but also an imaging to a surface being cylindrical, spherical or curved otherwise. At least a focusing lens 22 is present for forming line foci from said individual beams 13 along a second short axis $A_s$ direction y.

According to the present invention, the optical system shown in FIGS. 11 and 12 is able to create a target intensity distribution on said surface 6 from an input light beam 4 having an arbitrary input intensity distribution. As a light source an excimer laser as for example mentioned above may be used. Said light source emits said input light beam 4 propagating in a propagation direction z from the left hand side of the drawing to the right hand side. Said input light beam 4 has an extension in said first dimension x transverse to the propagation direction z and an extension in a second dimension y transverse to said first dimension x and to said propagation direction z.

The second array 10 and the first array 2 split said input light beam 4 into a plurality m of individual beams 13. In the present case the first and second arrays 2, 10 consist of m=3 cylindrical convex lenses (alternatively concave lenses or aspherical lenses and/or lenses having flat surfaces may be used) being arranged adjacent to each other. Therefore, m=3 individual beams 13 are formed from said input light beam 4. Instead of refractive lens arrays 2, 10 also other types of refractive elements may be used. Refractive elements in the present case are those where the main part of the incoming beam is refracted. The refractive elements, in particular the cylindrical lens arrays 2, 10, may be made of fused silica or calcium fluoride. Instead of refractive elements also reflective elements where the main part of the incoming beam is reflected, such as mirrors, in particular an array or arrays with cylindrical, aspherical or plane mirrors may be used. Furthermore it is possible to use diffractive elements instead.

Such diffractive elements may be for example one-dimensional Fresnel zone lenses, or linear gratings. Eventually, also combinations of refractive, reflective and/or diffractive elements are possible.

Some of said individual beams 13 at least partially overlap in said first dimension on said surface (field surface or final surface) 6. In the present case all m=3 individual beams 13 overlap completely in said first dimension on said surface which may be seen from the outer lines forming said beams 13.

According to the invention at least one beam displacing optical element is present for displacing at least one of said plurality of individual beams 13 in said second dimension y on said surface 6. In the first preferred embodiment, the deflection of the m individual beams 13 is realized by making the short axis $A_s$ focusing lens 22 composed of m sections 27 (as may be seen from FIG. 13) and displacing them laterally along the short axis $A_s$ (as is shown in FIG. 14). The location 25, 26 of each line beam 23, 24 in the field plane 6 is shifted by the same amount as the lenslet 27i,...27n, 27n+1,...27m. In the example above, the lenslets 27i,...27n, 27n+1,...27m accordingly have to be shifted by +−6.25 µm to generate a $T_y$=10 µm line beam.

It has to be noted that in the present preferred embodiment #1 the number m of individual beams is equal to the number m of beams being separated. Nevertheless, this is not a compulsory condition. This means that the number of sections 27 may be more or less as compared to the number of cylinders of the cylindrical arrays 2, 10.

Preferably, the lenslets 27i, ... 27n, 27n+1, ... 27m are shifted alternately to better average over inhomogeneities of the input beam 4 (FIG. 14). It has been found that shifting neighbouring lenslets 27n+1, 27n in the same direction along the short axis $A_s$ also leads to convenient results. This is in particular the case if all individual beams 13 overlap completely in said first dimension along the long axis $A_l$ and which is the case in the embodiment #1 shown in FIGS. 11 and 12.

Figure 13:
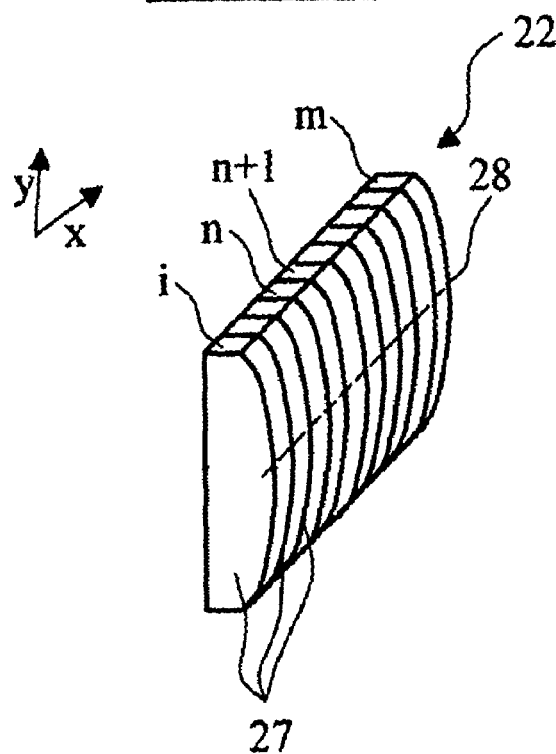
FIG. 13 is a perspective view of a cylindrical lens according to the prior art but being segmented transverse to the cylindrical axis.
Figure 14:
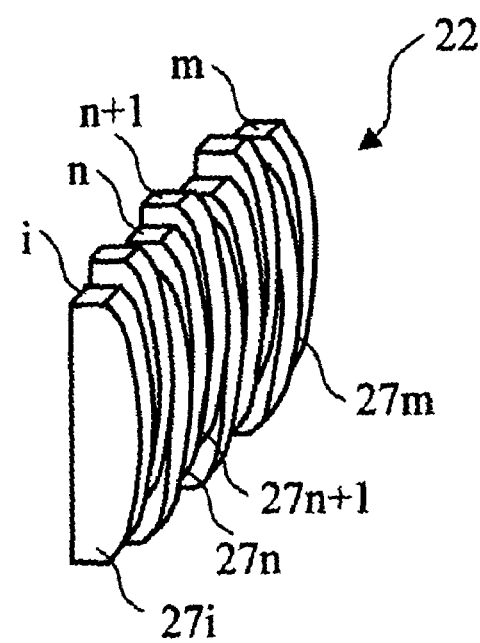
FIG. 14 is a perspective view of a beam displacing optical element according to the invention in the form of a segmented cylindrical lens according to FIG. 13 and being used in the optical system according to FIGS. 11 and 12.

For m→∞ the line 29 formed by the apex (maxima) of said shifted lenslets (which may not be individualized) is no more in parallel to the long axis direction $A_l$ as is the apex line 28 in the unshifted case shown in FIG. 13 but is inclined with an incline angle α. Such a cylindrical lens 30 with continuously shifted apex line 29 is shown in FIG. 15.

Figure 15:
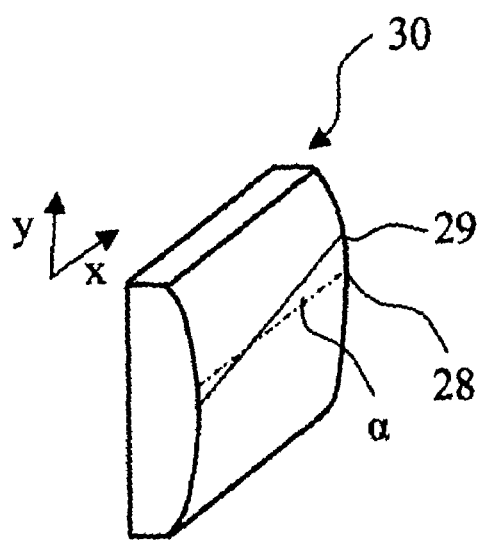
FIG. 15 is a perspective view of a beam displacing optical element according to the invention in the form of a convex cylindrical lens where the apex line is inclined with respect to a conventional convex cylindrical lens.
Figure 16:
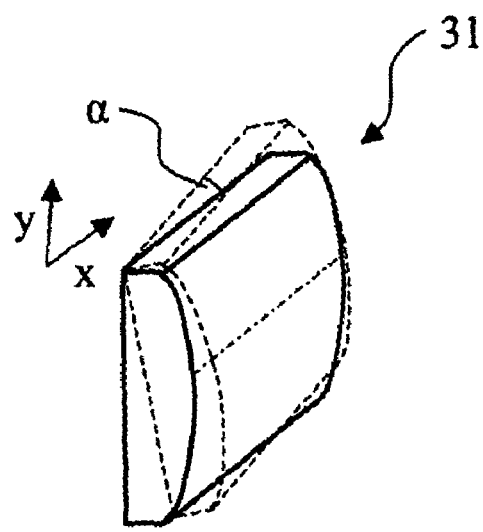
FIG. 16 is a perspective view of a beam displacing optical element according to the invention in the form of a convex cylindrical lens and which in an optical system according to the invention is envisioned to be arranged inclined with respect to said short or long axis direction.

Such an asymmetric lens 30 as shown in FIG. 15 is not fabricated as a standard lens. When changing the beam width of the target beam a new design is required. It has been found that also a standard (not segmented) cylindrical lens 31 may be used when rotating the lens 31 with respect to the optical axis, e.g. the propagation direction z of the individual beams in an optical system as e.g. shown in FIGS. 11 and 12. Such a rotation about an angle α is also indicated in FIG. 16.

In the present case the beam separating optical element 22, 30 is made of a material being mainly refractive, such as fused silica or calcium fluoride. Instead of a beam separating element of reflective type also beam separating elements of reflective or diffractive type may be used.

Preferred Embodiment #2

The segmented focusing lens as in embodiment #1 requires very fine mechanical adjustment because the beams shift by the same amount as the lenslets. This can be avoided by introducing a separate (segmented) lens 22, 30, 31 with a long focal length $f_{segmented}$. The adjustment that is necessary scales as the focal length, and thus very convenient mechanical adjustment accuracies of the order of 0.1 mm are sufficient for a fine-tuning of the intensity distribution in the field plane. The additional lens can be located anywhere in in the region wherein the individual beams are separated, e.g. between the lenslet arrays.

Figure 17:
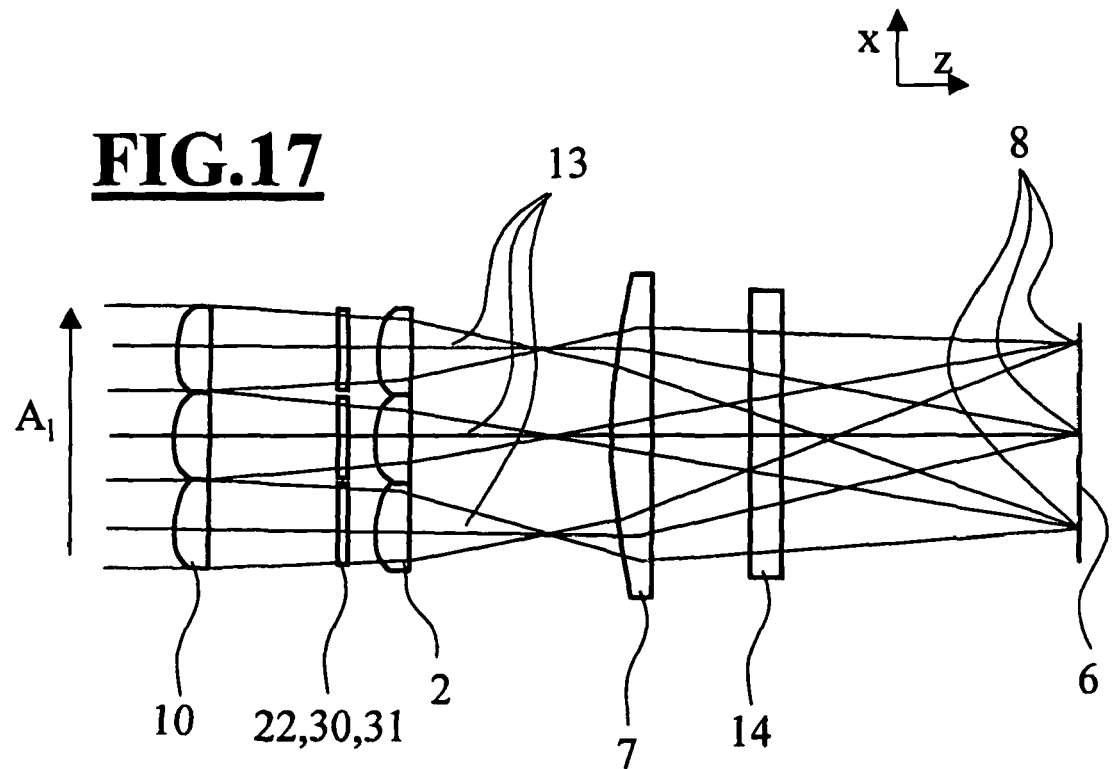
FIG. 17 is a plane view in the xz-plane of a second preferred embodiment of an optical system according to the invention.
Figure 18:
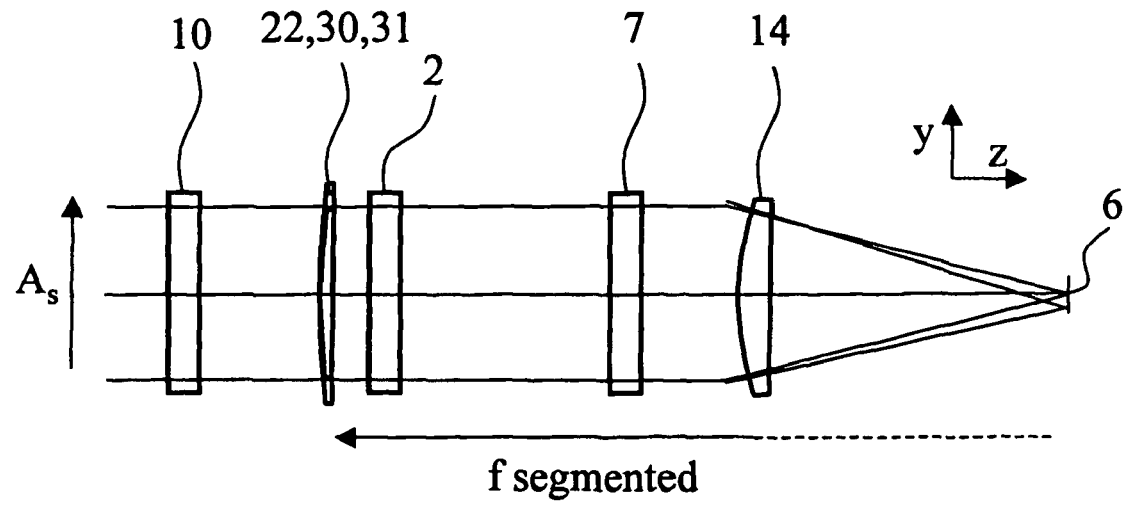
FIG. 18 is a plane view in the yz-plane of the second preferred embodiment of an optical system according to FIG. 17.

FIGS. 17 and 18 show plane views in the xz-plane and in the yz-plane of a second preferred embodiment of an optical system according to the invention, which differs from that shown in FIGS. 11 and 12 in that weak power (segmented) lens 22, 30, 31 are arranged between the lenslet arrays 2, 10 and in that the focusing lens 14 is a cylindrical lens as is e.g. shown in FIG. 4. It is obvious for a person skilled in the art that instead of a weak power segmented lens 22 also a rotated (or a rotatable) cylindrical lens 31 or a lens 30 with an inclined apex line with respect to the x-direction as shown in FIGS. 15 and 16, respectively, may be used.

Preferred Embodiment #3

The additional lens 22, 30, 31 from embodiment #2 can be incorporated in any other element, e.g. the cylindrical arrays, by segmenting one of these, giving one side a slight curvature along the short axis $A_s$, and making the segments adjustable.

It is obvious for a person skilled in the art that instead of segmenting said elements also a rotation of said cylindrical lenses or an inclination of the apex line of said cylindrical or curved lenses with respect to the x-direction defining the short dimension of the target beam distribution as e.g. shown in FIGS. 15 and 16, respectively, may be possible.

Preferred Embodiment #4

The segmented lens can be replaced by any other element that allows adjustable deflection of a beam. Another fourth preferred embodiment uses wedges 32, 33, 34.

Multiple wedge prisms of different deflection angles for beam displacement have—in different applications and different combinations with optical systems—also been applied in the state of the art. However, for high power intensity distributions of large aspect ratio this implementation is not convenient, since the resulting small wedge angles are difficult to fabricate, or the tilt angles of the wedge prisms have to be aligned with very high precision, respectively. The small tilt angle of the wedges being necessary for small beam displacements required for the highly efficient optical system according to the present invention results from the large focal length of the condenser lens. The tilt angles being required for applications according to the invention will be in the order of 10 to 30 µrad.

The application for wedge prisms of different prism angles is thus preferably only applicable for intensity distributions with aspect ratios <100. However, it is possible to fabricate prisms of identical and large prism angle of few degrees with very high precision. The inventors realized that it is possible to achieve small beam deflection angles by rotation of the prisms perpendicular to the prism wedge. Therefore, the fourth preferred embodiment uses wedges 32, 33, 34 with adjustable tilt angles $α_{32}$, $α_{33}$ respectively. This fourth embodiment is shown in FIGS. 19 and 20.

This embodiment comprises two cylindrical lens arrays 2, 10 forming a two-stage fly-eye homogenizer 12 for homogenizing an incoming beam in a first long axis $A_l$ direction x, a convex condenser lens 7 for imaging the individual beams 13 created by the two cylindrical lens arrays 2, 10 to a plane intermediate field surface, a plane field surface or a final plane surface 6 (see explanations above). It has to be noted that this surface 6 may also be cylindrical, spherical or curved otherwise. In the propagation direction z between said first and said second arrays 2, 10 a set of wedges 32, 33, 34 with identical wedge angles β and being rotatable around a rotation axis 35 are arranged adjacent to each other in said long axis direction $A_l$. Instead of wedges 32, 33, 34 having identical wedge angles β also wedges having different angles $\beta_1, \beta_2, \ldots$ may be used, whereby the beam deflection may be adjusted by additionally rotating the prisms with respect to rotation axis 35. At least a focusing lens 14 is present for forming line foci from said individual beams 13 along a second short axis $A_s$ direction y.

Figure 19:
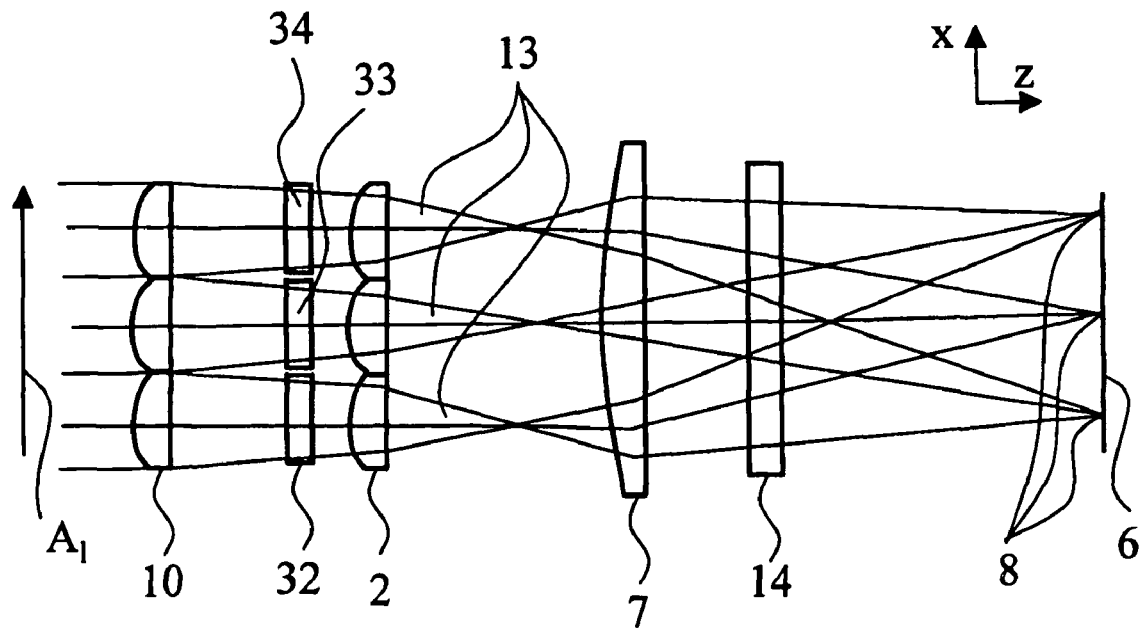
FIG. 19 is a plane view in the xz-plane of a fourth preferred embodiment of an optical system according to the invention.
Figure 20:
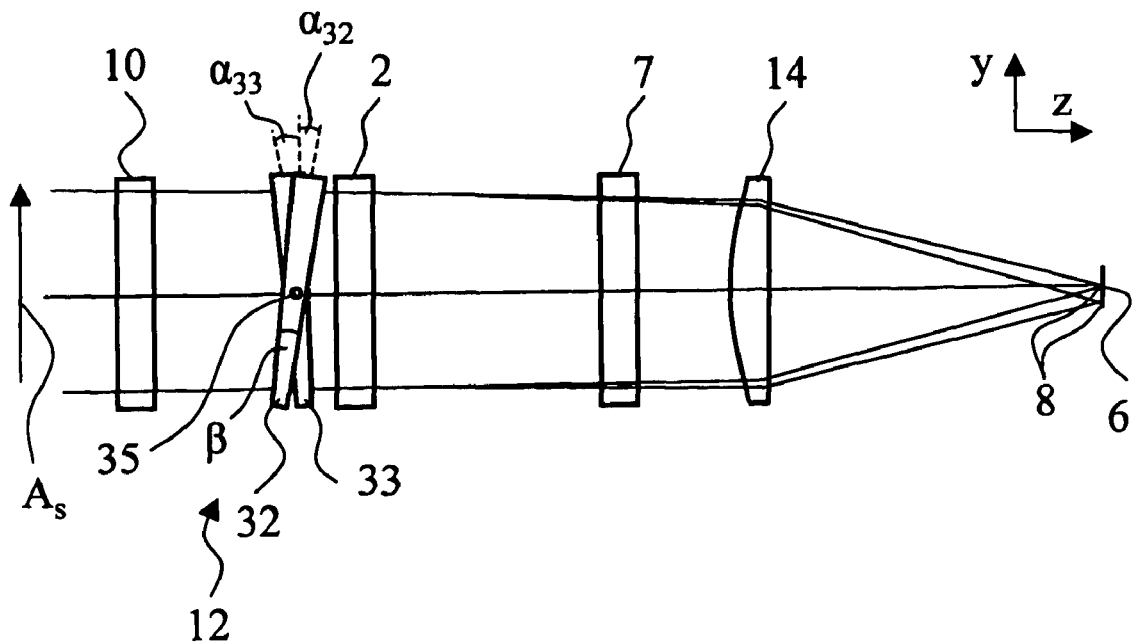
FIG. 20 is a plane view in the yz-plane of the fourth preferred embodiment of an optical system according to FIG. 19.

According to the present invention, the optical system shown in FIGS. 19 and 20 is able to create a target intensity distribution on said surface 6 from an input light beam 4 having an arbitrary input intensity distribution. As a light source again an excimer laser as for example mentioned above may be used. Instead of an excimer laser any other light source or in particular any other laser, such as e.g. a solid state laser, a $CO_2$-laser etc. may be used.

Said light source emits said input light beam 4 propagating in said propagation direction z from the left hand side of the drawing to the right hand side. Said input light beam 4 has an extension in said first dimension x transverse to the propagation direction z and an extension in a second dimension y transverse to said first dimension x and to said propagation direction z. The second array 10 and the first array 2 split said input light beam 4 into a plurality m of individual beams 13. In the present case the first and second arrays 2, 10 consist of m=3 cylindrical lenses being arranged adjacent to each other. Therefore, m=3 individual beams 13 are formed from said input light beam 4.

Some of said individual beams 13 at least partially overlap in said first dimension on said surface (field surface) 6. In the present case all m=3 individual beams 13 overlap completely in said first dimension on said surface which may be seen from the outer rays of said beams 13.

According to the invention at least one beam displacing optical element is present for displacing at least one of said plurality of individual beams 13 in said second dimension y on said surface 6. In the fourth preferred embodiment, the deflection of the m individual beams 13 is realized by having said set of m=3 wedges 32, 33, 34 introduced between said first and said second arrays 2, 10 whereby said wedges 32, 33, 34 being inclined with respect to each other as is indicated by the angles $\alpha_{32}, \alpha_{33}$ representing an inclination with respect to the xy-plane.

The inclination $\alpha_{32}, \alpha_{33}$ of said wedges 32, 33, 34 with respect to the xy-plane and therefore the inclination with respect to each other is adjustable by rotating said wedges 32, 33, 34 around said axis 35 with the aid of corresponding actuators such as piezoelectric crystals (not shown) or stepmotors (not shown).

This approach allows a very fine control of the deflection angle and thus a very fine control of the expansion of the light beam 8 in the short axis direction $A_s$ in the field plane 6. It is worth mentioning that embodiments #1, #2, #3 may also comprise respective actuators, motors etc. in order to adjust the position of the segments $27i, \ldots 27n, 27n+1, \ldots 27m$ of the beam deflection element 22 according to FIG. 14 with respect to each other as well as the incline angle α of the cylindrical lens 16 according to FIG. 16.

Preferred Embodiment #5

The deflection of the m individual beams can also be achieved by introducing a segmented reflective component. The simplest is a segmented flat mirror placed somewhere in the region wherein the individual beams are separated. The segmented flat mirror can fold the beam path in the short axis (as shown in FIGS. 21 and 22 and described in the following) or in the long axis or in any other plane.

Figure 21:
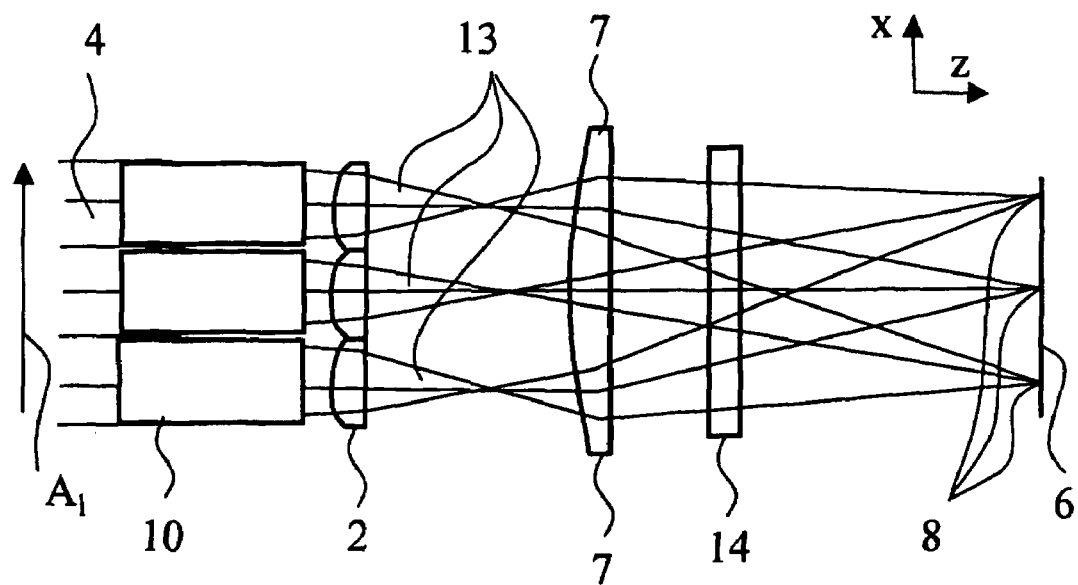
FIG. 21 is a plane view in the xz-plane of a fifth preferred embodiment of an optical system according to the invention.
Figure 22:
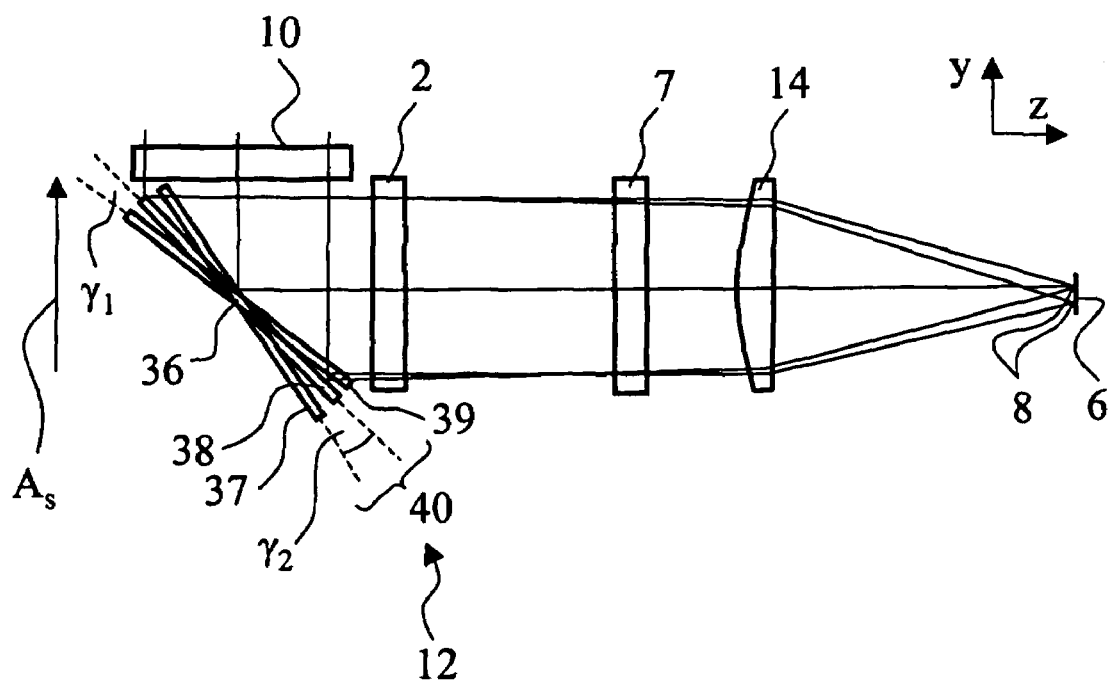
FIG. 22 is a plane view in the yz-plane of the fifth preferred embodiment of an optical system according to FIG. 21.

This fifth embodiment shown in FIGS. 21 and 22 in the form of plane views in the xz-plane and the yz-plane respectively comprises exemplarily two cylindrical lens arrays 2, 10 and a condenser lens 7 forming a two-stage fly-eye homogenizer 12 for homogenizing an incoming beam 4 in a first long axis $A_l$ direction x. The two cylindrical lens arrays 2, 10 create m=3 individual beams 13 by separating the incoming beam 4. The convex condenser lens 7 condenses the individual beams 13 created by the two cylindrical lens arrays 2, 10 to an intermediate field surface, a field surface or a final surface 6 as is already explained in detail above with respect to embodiment #4.

In the propagation direction z between said first and said second arrays 2, 10, which are arranged perpendicular to each other in the xy-plane (first array 2) and the xz-plane (second array 10), said beforehand mentioned segmented flat mirror 40 comprising in the present case m=3 mirror segments 37, 38, 39 is arranged for deflecting and displacing said individual beams 13 in said short axis $A_s$ direction y. A focusing lens 14 is present for forming line foci from said individual beams 13 along said second short axis $A_s$ direction y.

According to the present invention, the optical system shown in FIGS. 21 and 22 is capable to create a target intensity distribution on said surface 6 in the form of a nearly rectangular elongated line having a high aspect ratio (e.g. a high ratio of the line extension in the long axis $A_l$ direction x to the extension in the short axis $A_s$ direction y) exceeding a value of 1,000 from an input light beam 4 having an arbitrary input intensity distribution.

As a light source again an excimer laser as for example mentioned above may be used. Said light source emits said input light beam 4 propagating in a propagation direction -y, being deflected by said mirror 40 essentially in said z-direction and propagating in said z-direction from the left hand side of the drawing to the right hand side. Said mirror 40 may be made for example of fused silica, Zerodur (which is the trademark of a material being sold by the Schott AG) or ULE (which is the trademark of a material being sold by Corning company).

Said input light beam 4 has an extension in a first dimension x transverse to the propagation direction -y, z and an extension in a second dimension z, y transverse to said first dimension x and to said propagation direction -y, z.

The second array 10 and the first array 2 split said input light beam 4 into a plurality m of individual beams 13. In the present case the first and second arrays 2, 10 consist of m=3 cylindrical lenses being arranged adjacent to each other. Therefore, m=3 individual beams 13 are formed from said input light beam 4. In the present case all m=3 individual beams 13 overlap completely in said first dimension on said surface which may be seen from the outer rays forming said beams 13.

According to the invention again a beam displacing optical element is present for displacing said plurality m of individual beams 13 in said second dimension y on said surface 6. In the present fifth preferred embodiment, the deflection of the m individual beams 13 is realized by said segments 37, 38, 39 of said mirror 40 being introduced between said first and said second arrays 2, 10. This is achieved by inclining said mirror segments 37, 38, 39 with respect to each other as is indicated by the angles $\gamma_1, \gamma_2$. (Please note that the incline angles $\gamma_1, \gamma_2$ are not drawn in proportion). In general, these angles $\gamma_1, \gamma_2$ will be in the order of 10 to 30 μrad.

The inclination $\gamma_1, \gamma_2$ of said mirror segments 37, 38, 39 with respect to each other is adjustable by rotating said mirror segments 37, 38, 39 around an axis 36 with the aid of corresponding actuators such as piezoelectric crystals (not shown) or step-motors (not shown).

However, as explained above with respect to embodiment #4, for generating of intensity distributions having large aspect ratios the tilt angles must be very small. The tilt angles of the mirrors used here must be in the order of less than 10 μrad. Assuming a mirror diameter of 10 mm, this would result in a deviation perpendicular to the mirror of about <less than 1 μm, which is very difficult to maintain, especially when considering the mechanical and thermal sensitivity of the tilted mirrors. Also if imaging optics are used the deviation of the mirror has to be smaller than 30 μm. Thus the application of tilt mirrors is preferably used for generating intensity distributions with aspect ratios lower than 100. For generating intensity profiles having a higher aspect ratio it is preferable to actively manipulate and control the mirror deflection angles $\gamma_1, \gamma_2$ by drive units such as piezo stacks for each individual mirror segment in combination with e.g. a power sensor close to the field plane.

Figure 23:
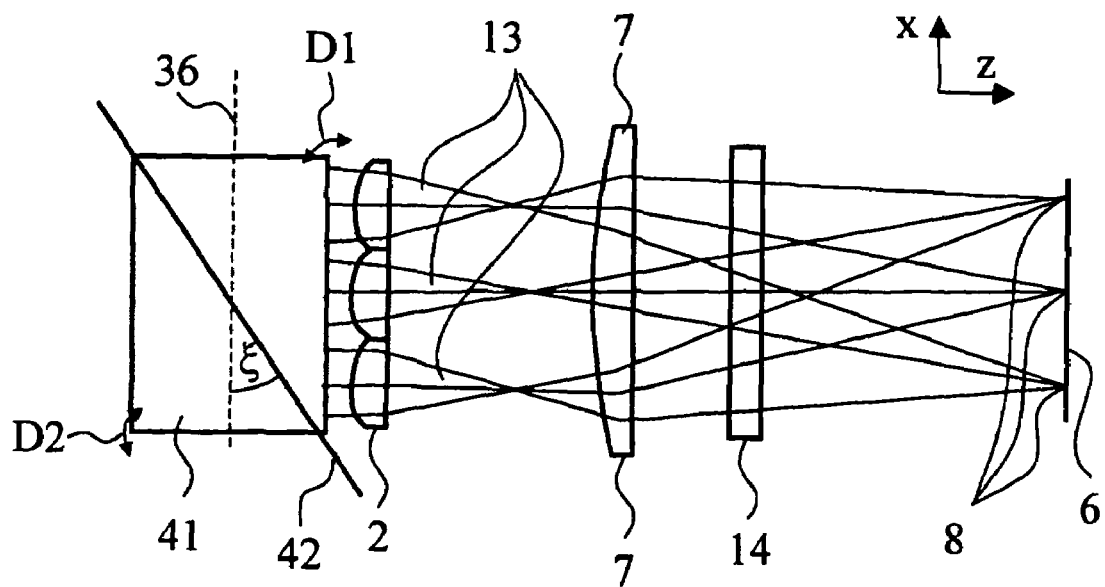
FIG. 23 is a plane view in the xz-plane of a an amendment of said fifth preferred embodiment of an optical system according to FIGS. 21 and 22.
Figure 24:
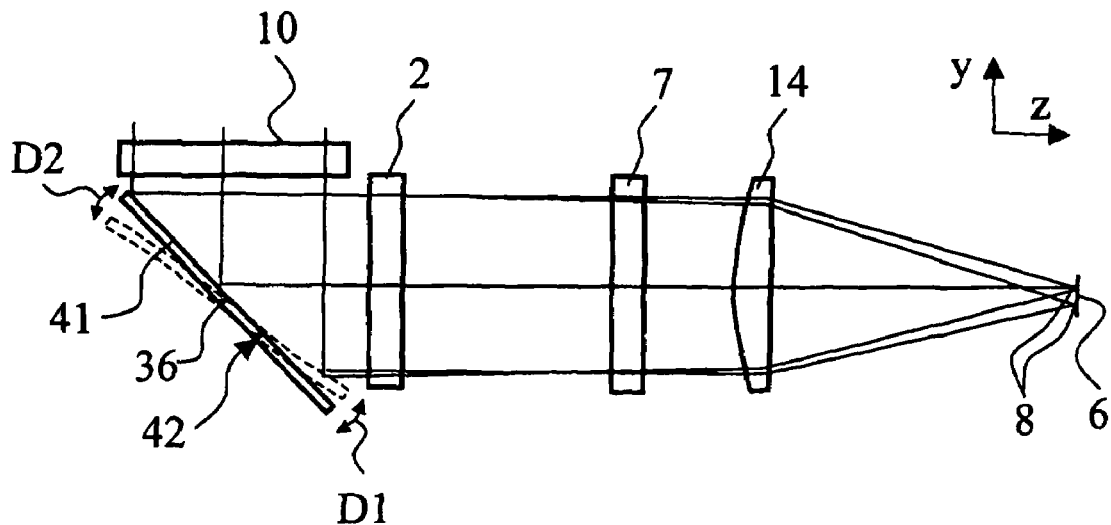
FIG. 24 is a plane view in the yz-plane of said amendment of said fifth preferred embodiment of an optical system according to FIG. 23.

The inventors however realized that instead of a segmented mirror 40 also a one-piece mirror 41 may be used as is shown in FIGS. 23 and 24 (FIG. 23 corresponds to FIG. 21 but does not show cylindrical array 10; FIG. 24 corresponds to FIG. 22). The one-piece mirror 41 is not rotatable around an axis 36 in x-direction as one part (as is the case for the segments 37, 38, 39 according to FIGS. 23, 24). Instead, the rotation angle around axis 36 changes continuously across the mirror 41, leading to a twist of the mirror 41 indicated with the arrows D1, D2. This is equivalent to changing the mirror to a slight cylindrical shape along an off-axis direction 42. The mirror 41 can be manufactured with this slight cylindrical shape, or manufactured as a plane mirror and bent mechanically.

Nevertheless, also respective actuators, such as piezo-electric crystals, being in functional relation to said one-piece-mirror 41 or a motor may be present in order to adjust the bending of the mirror 41, respectively.

Instead of a twisting giving said mirror 41 the predetermined shape as explained above also a curved, in particular cylindrically bent mirror may be used being rotatable around said axis 42.

Preferred Embodiment #6

Figure 25:
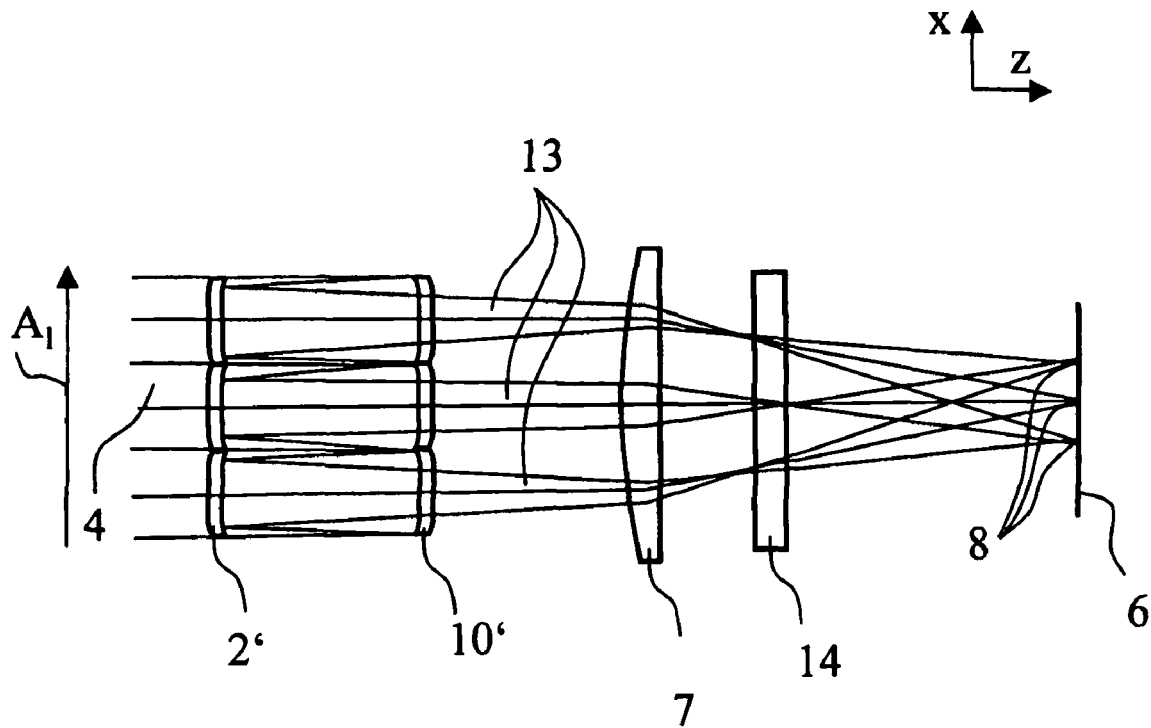
FIG. 25 is a plane view in the xz-plane of a sixth preferred embodiment of an optical system according to the invention.
Figure 26:
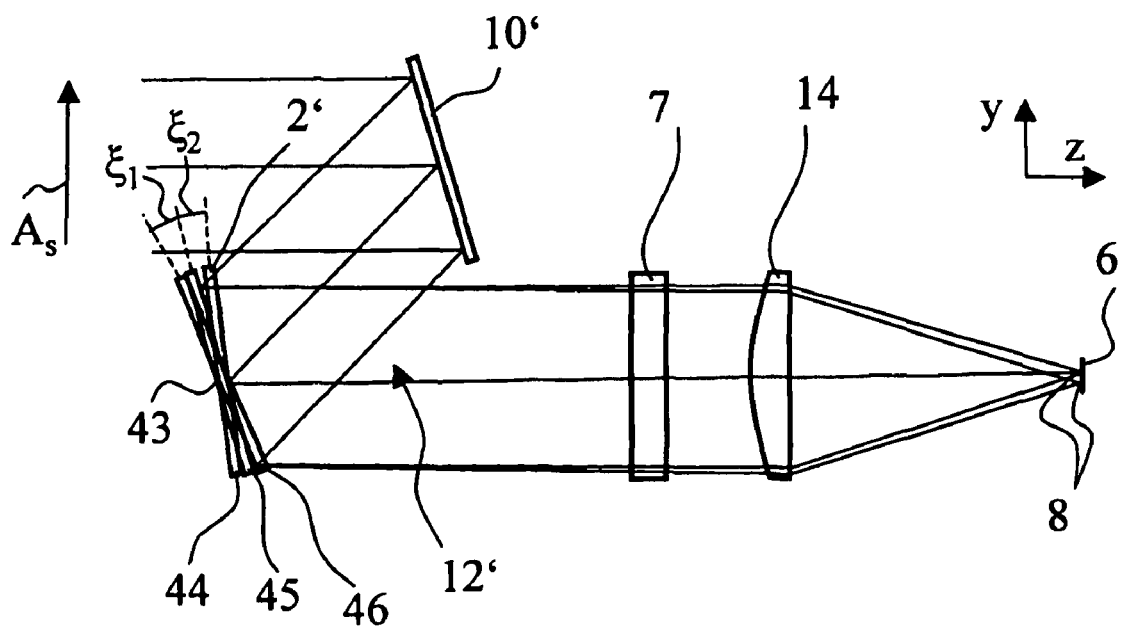
FIG. 26 is a plane view in the yz-plane of the sixth preferred embodiment of an optical system according to FIG. 25.

Instead of introducing a separated segmented mirror as in preferred embodiment #5, it is also possible to compose the optical system partly or entirely of reflective components and realize any of these as a segmented optical part. FIGS. 25 and 26 show an example, where the arrays 2, 10 are reflective and one of them segmented and/or adjustable in angle. Reflective means in the present case that the main part of an incoming beam is reflected at the arrays 2, 10.

This sixth embodiment shown in FIGS. 25 and 26 in the form of plane views in the xz-plane and the yz-plane comprises exemplarily two cylindrical mirror arrays 2', 10' and a convex condenser lens 7 forming a two-stage "fly-eye" homogenizer 12' for homogenizing an incoming beam 4 in a first long axis $A_l$ direction x for imaging the individual beams 13 created by the two cylindrical mirror arrays 2', 10' to an (intermediate field or field or final) surface 6 and a focusing lens 14 for forming line foci from said individual beams 13 along a second short axis $A_s$ direction y.

According to the present invention, the optical system shown in FIGS. 25 and 26 is capable of creating a target intensity distribution on said surface 6 in the form of a nearly rectangular elongated line having a high aspect ratio of more then 1,000 from an input light beam 4 having an arbitrary input intensity distribution. As a light source 4 again an excimer laser may be used. Said light source 4 emits said input light beam 4 propagating in a propagation direction z. Said second cylindrical mirror array 10' which is inclined with respect to the xy-direction by rotation around an axis 43 being in parallel to the x-axis reflects and separates said incoming beam 4 into a plurality m of individual beams 13. The m=3 separate individual beams 13 are directed to said first cylindrical mirror array 2'. The cylindrical mirror arrays 10', 2' may be made of fused silica, a glass ceramics being sold by the Schott AG, Mainz, Germany under the trademark Zerodur or a glass being sold by Corning, N.Y., USA under the trademark ULE.

Said first cylindrical mirror array 2' consists of m=3 separate individual cylindrical mirror segments 44, 45, 46 being independently rotatable around said axis 43 running in parallel to the x-direction. The separate individual cylindrical mirror segments 44, 45, 46 being arranged adjacent to each other in said x-direction are adjusted such that they are inclined with respect to each other in said xz-plane (incline angles $\xi_1, \xi_2$ are not drawn to scale; typical values are +/−10-30 μrad delivering respective displacements of +/− several μm). The separate individual cylindrical mirror segments 44, 45, 46 m=3 reflect and in particular displace said separate individual beams 13 in said short axis $A_s$ direction y. The condenser lens 7 images said separated and displaced beams 13 to the (field) surface 6. The focusing lens creates line foci on said surface 6. In the present case all m=3 individual beams 13 overlap completely in said first dimension on said surface which may be seen from the outer lines from said beams 13.

All these preferred embodiments can be realized with full adjustability or one-time setting at the initial alignment of the system.

Preferred Embodiment #7

Figure 27:
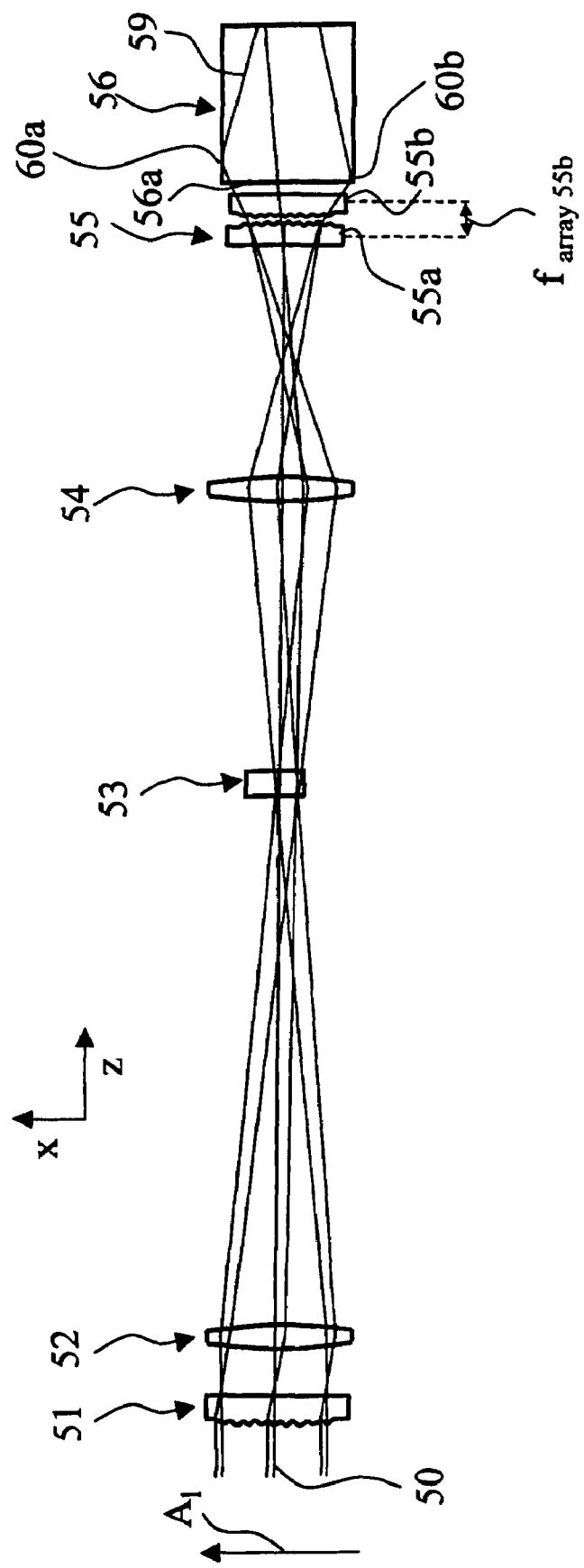
FIG. 27 is a plane view in the xz-plane of a seventh embodiment of an optical system according to the invention (entrance part)

The seventh embodiment shown in FIGS. 27, 28, 29 according to a preferred version of the invention is used for the fabrication of polycrystalline silicon films from amorphous silicon films deposited on a substrate (also known as "panel") using the so called TDX-process.

This technique is based on a form of controlled super-lateral growth (SLG) where the panel is irradiated with a very thin (therefore this dimension is called short axis $A_s$) beam that completely melts the amorphous silicon film being deposited on said substrate and subsequently allows for lateral crystal growth of large grains to proceed from seeds at the edge of the molten region. By sufficiently limiting the beam width (here for example 5-15 μm) it is ensured that the entire melt region is crystallized via lateral growth, without any nucleation that leads to regions of small grains, which for example can be observed with a larger beam width.

The other dimension of the beam is made as long as possible (therefore this dimension is called long axis $A_l$) in order to ensure high degree of uniformity and high throughput. The entire width of the panel (e.g. more than 700 mm) is exposed in each pulse, avoiding the non-uniformity of the stitched regions that are seen in multi-pass exposure techniques (such as SLS). During exposure, the panel is scanned at a constant (continuous or stepped) velocity, and the laser is triggered to fire after a translation of approximately 2 μm (laser repetition rate around 6 kHz, laser pulse energy around 150 mJ, laser power 300-900 W). Each pulse melts a 5-15 μm×~700 mm region, which will undergo lateral crystal growth using a seed from the poly-Si of the previous pulse, producing long crystal grains in the scan direction (short axis $A_s$ direction y). Only two to three pulses are used to expose each area, as compared to 20-40 pulses used in standard Excimer Laser Annealing (ELA), providing much higher panel throughput.

The system described in the following and referring to the drawings shown in FIGS. 27, 28 and 29 consists in an optical system quite similar to that shown in FIGS. 11 and 12 but where the segmented lens 22 is replaced by a cylindrical lens element 53 which will be rotated around the optical axis z. In order to create a line beam with nearly rectangular field shape, high aspect ratio and a well homogenized top-hat profile along the short axes a two step homogenizer is required or at least advantageous. Each step of the two-step homogenizer may consist in a single-stage homogenizer but may also comprise more than one individual stages.

US 2005 0031261 A1 for example describes a two step homogenizer consisting of two single-stage homogenizers, namely a cylindrical lens array with condenser lens (fly's eye homogenizer) and a rod. The configuration described in this document is only used to homogenize one predetermined direction. The residual inhomogeneity of the fly's eye (first step) is improved by the rod (second step). In contrast to this the present solution which will be described in the following uses a first fly's eye to create a uniform distribution at the cylindrical lens element which is rotated around the z-axis. At the entrance of the rod there is no homogeneous distribution of the laser profile. Only the angular distribution of the rotated cylindrical lens is homogeneously distributed over the cross section. The rod is used to homogenize the non uniform input beam profile.

Another prior art document, namely EP 1 400 832 A1, uses a rod only for homogenizing the input laser beam along a width direction. The present solution which will be described hereinafter uses the rod for homogenizing an input laser beam along the length direction.

Similar to the nomenclature used above, the following notation will be used below: The x-axis is the long axis $A_l$ with a size at the final plane (panel) larger than 300 mm. The y-axis is the short axis $A_s$ with a size at the final plane in the range between 5 to 200 µm, preferably between 5 to 20 µm, corresponding e.g. to a size in the (intermediate) field (stop) plane in the range between 50 to 2000 µm, preferably between 50 to 200 µm for a demagnification M=10. Only the homogenization of the long axis $A_l$ up to the end of the rod 56 and the homogenization of the short axis $A_s$ up to the field plane is presented. The imaging of the rod 56 exit to the final plane (panel) in the long axis $A_l$ direction requires at least 2 cylindrical lenses (or mirrors). This is not presented here. A respective arrangement is shown in connection with embodiment #8.

The optical system shown in FIGS. 27 and 28 is able to create a target intensity distribution having a (nearly) rectangular outer shape and an aspect ratio of more than 1,000, preferably more than 10,000, on a surface 58 from an input light beam 50 having an arbitrary input intensity distribution. As a light source (not shown here) e.g. an excimer laser (see above) may be used. Said light source emits said input light beam 50 propagating in a propagation direction z from the left hand side of the drawing to the right hand side. Said input light beam 50 has an extension in the first dimension x (i.e. here the long axis $A_l$ direction) transverse to the propagation direction z and an extension in a second dimension y (i.e. here the short axis $A_s$ direction) transverse to said first dimension x and to said propagation direction z.

The homogenizer consists of said two separate homogenization steps 51, 56. The configuration is shown in FIG. 27. The first step is a cylindrical lens array 51 (fly's eye) in combination with a condenser lens 52. Instead of this single cylindrical lens array 51 also a double stage homogenizer comprising two cylindrical arrays as shown above may be used. The second step consists of said afore mentioned rod 56 in combination with a double cylindrical fly's-eye 55 and a condenser lens 54.

The task of the first homogenizer 51 is to create a light beam with uniform intensity distribution along the long axis $A_l$ at the cylindrical lens element 53 from the input intensity distribution of the input light beam 50.

The cylindrical lens element 53 has an optical power in the short axis $A_s$ direction y. The cylindrical lens element 53 can be rotated about the optical axis 50. The effect of rotation is a deflection of beams with a distance to the optical axis 50 in the long axis $A_l$ direction y. The deflection is proportional to the axial distance from the optical axis 50 in the long axis $A_l$ direction y.

In the second homogenization stage 56 the angular distribution at the cylindrical lens element 53 is condensed by a condenser lens 54 to a cylindrical lens array 55 consisting of two elements 55a, 55b. This means that a fan of rays starting from the cylindrical lens element 53 is distributed over the whole area of the cylindrical lens array 55. In other words a certain deflected beam in the short axis $A_s$ direction y is distributed over the whole area of the cylindrical lens array 55.

The angular distribution at the entrance of the lens array 55 is depending on the field position at the cylindrical lens element 53. The fan of rays at the cylindrical lens array 55 entrance is tilted according to the spatial distance of the field at the cylindrical lens element 53.

To compensate for this the cylindrical lens array 55 is used under a special arrangement. The distance of the second array 55b to the first one 55a is equal to the focal length $f_{array\ 55}b$ of the second element 55b of the lens array 55. In this configuration the output angle is only determined by the position of the ray at the first element 55a of the lens array 55. The second task of the lens array 55 is to define an angular distribution which is required for the homogenization with the following rod 56.

Figures 28A, 28B, 28C, 28D, 28E, 28F:
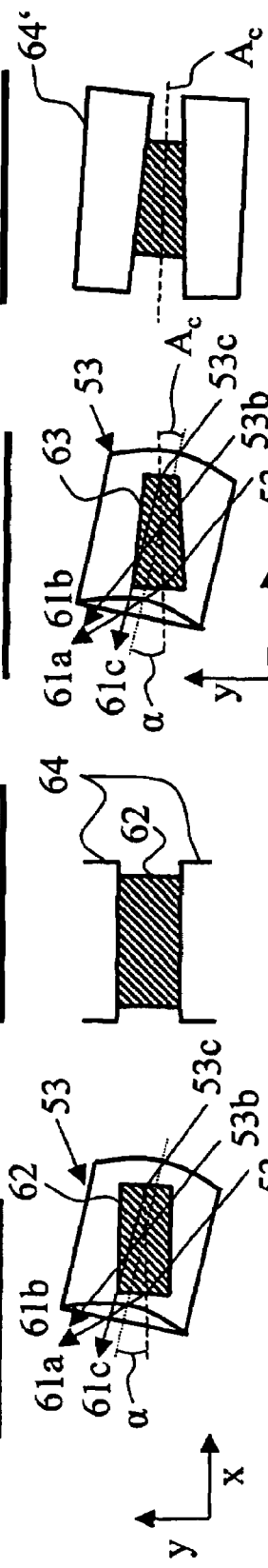
FIG. 28a is a perspective view of a rotated cylindrical lens which is part of the seventh embodiment according to FIG. 27.
FIG. 28b is a perspective view of the lens according to FIG. 28a showing the area of the incoming beam being clipped.
FIG. 28c is a plane view in the yz-plane of the seventh embodiment of an optical system according to FIG. 27 (exit part) showing focusing of the beam onto a field plane, where the rotated cylindrical lens according to FIG. 28a is hit in the centre along the long axis x.
FIG. 28d is the plane view in the yz-plane of the seventh embodiment of an optical system according to FIG. 28c (exit part) showing focusing of the beam onto a field plane, where the rotated cylindrical lens according to FIG. 28a is hit at the edge in the long axis direction x.
FIG. 28e is a cross sectional view along X1-X1 of FIG. 28c when a field-stop forming a slit in the long axis direction having parallely running linear edges.
FIG. 28f is a cross sectional view along X1-X1 of FIG. 28c when using a clipping blade having inclined running linear edges in the long axis direction.

The rod 56 has an antireflection coating 56a at the entrance area. If a ray inside the rod 56 hits the boundary 56a between glass 56 and air there occurs an internal reflection which keeps the ray 59 in the rod 56. After several reflections 60a, 60b a uniform distribution at the exit 56b of the rod 56 is achieved (FIG. 27). Reflections 60a, 60b only occur in the long axis $A_l$ direction x. In the short axis $A_s$ direction y there is no reflection (FIGS. 28c, 28d). The rod size in the short axis $A_s$ direction y is larger than the beam size 61 in the short axis $A_s$ direction y. Besides the homogenization in the long axis $A_l$ direction x the rod 56 has also the task to distribute the angular displacement produced by the lens element 53 equal over the long axis $A_l$ direction x. The imaging of the rod 56 exit 56b to the final plane (panel) in the long axis $A_l$ direction y requires at least three cylindrical lenses (or mirrors), which are in not presented here. Nevertheless details are explained in connection with embodiment #7. The magnification factor is in the order of 10 to 200.

FIG. 28 shows the principle of the beam deviation in the short axis $A_s$ direction y as a function of the beam position in the long axis $A_l$ direction x. FIG. 28a shows a cross section of the rotatable cylindrical lens element 53 in the xy-plane. FIG. 28c shows a cross section of the beam path along the optical axis 50 and the short axis direction including only the respective optically active elements. FIG. 28d shows a cross section of the beam path along the short axis $A_s$ direction y in a plane in parallel to that shown in FIG. 28c but for another position in the long axis direction. Because of the tilted cylindrical lens 53 the central ray 53a does not hit the cylindrical lens 53 in the centre but at a distance y from the centre which is proportional to the rotation angle α.

The hatched rectangle 62 in FIG. 28a is the beam shape at the lens element 53. This beam shape may already correspond to that being generated by array 51 and condenser lens 52. Alternatively, in addition said homogenized beam may be clipped at the edges in the short axis $A_s$ direction y using an aperture 64 or an arrangement similar to that shown in FIG. 28e.

As already explained the distribution in the long axis $A_l$ direction x is homogeneous. The center ray 53b with the beam coordinates (0,0) hits the cylindrical lens 53 in the center and will not be affected. The left ray 53a with the beam coordinates (−x,0) hits the lens 53 in the lower part and will be deflected in the upper direction. The right ray 53c with the coordinates (x,0) hits the lens 53 in the upper part and will be deflected in the lower direction. For low deflection values as will be the case here the deflection is a linear function of the x coordinate.

The deflected beams 61a, 61b, 61c, 61 are condensed by means of the cylindrical condenser lens element 57 (or alternatively by a condenser mirror (not shown)) onto the (intermediate) field (stop) plane 58. The respective position of the deflected beams 61a, 61b, 61c, 61 at the field (stop) plane 58 is proportional to the deflection and therefore proportional to the rotation of the lens element 53 around the z axis. FIG. 28d shows the corresponding rays 61a to 61b at the field (stop) plane 58. Also shown is the optical path of rays 61 with a distance x in the long axis $A_l$ direction from the optical axis 50 in the short axis $A_s$ direction y which are parallel to the optical axis 50. These rays 61 are focused onto the field (stop) plane 58 by means of the focusing lens 57. FIG. 29c shows the calculated intensity distribution of the respective beam 64 along the short axis $A_s$ using an input light.

The laser itself has a divergence profile which could change in time. Without rotation of the lens element 53 this divergence profile will be condensed by the lens element 53 and the lens element 57 as spatial distribution in the short axis $A_s$ direction at the field (stop) plane 58. This profile is shown in FIG. 29a. In the next steps the creation of a homogeneous distribution is explained. The rotation of lens element 53 produces a shift at the field (stop) plane 58 which is proportional to the distance in the long axis $A_l$ direction at the position of the lens element 53. Because the intensity distribution at the lens element 53 is homogeneous due to the first stage of homogenization it will create a top hat intensity distribution at the field (stop) plane 58 for parallel rays which incident onto the lens element 53. The width $T_y$ of the top hat is proportional to the rotation angle α of the lens element 53. The distribution of the top hat is shown in FIG. 29b. The top hat distribution is a result of simulation if the divergence of the laser and diffraction are not considered.

Because of the laser divergence in the short axis direction the result at the field (stop) plane 58 is the convolution of the spatial distribution of the condensed laser divergence (FIG. 29a) and the top hat distribution (FIG. 29b) created by the rotated lens element 53.

In order to increase the lateral growth length of the Si-crystals an asymmetrical intensity distribution is advantageous. The light intensity close to the leading edge of the beam profile may be lower than that of the trailing edge. This can be achieved by clipping the laser beam profile as shown in FIG. 28b by means of blades. The integrated intensity over the short axis $A_s$ extension y is decreasing linearly as a function of the position in the long axis $A_l$ direction x. The integrated intensity at one position x will result in an intensity in the field (stop) plane 58 at a certain position. The position at the field (stop) plane 58 is a linear function of the long axis $A_l$ position x. Therefore also the intensity at the field (stop) plane 58 is varying with the same function as the integrated intensity at the lens element 53. For the beam profile shown in FIG. 28b the intensity distribution at the field (stop) plane 58 is expected as a linear ramp $R_y$.

The asymmetrical beam profile with the ramp $R_y$ can easily be created by clipping the upper and lower part with an aperture deviating from that shown in FIGS. 28c, d, e. The aperture has the shape like the hatched area 63 shown in FIG. 28b. Or it could be realized by two single edges which are clipping the profile in the upper and the lower part as shown in FIG. 28f.

For the clipped beam profile shown in FIG. 29e the distribution is like a ramp $R_y$ instead of the top hat $T_y$. After convolution with the spatial distribution of the condensed laser divergence there is still the ramp $R_y$ visible (FIG. 29f).

The blades 64' for generating the ramp $R_y$ in the short axis $A_s$ direction y should be placed in any plane in front of the rotated cylindrical lens 53. In a preferred solution the clipping of the blades 64' is symmetrical with respect to a center axis $A_c$ in the upper and lower part of the beam in the short axis $A_s$ direction x. In this case a beam shift in the short axis direction has only a minor influence onto the transmission through the clipping blades 64'. The blades 64' could produce a linear ramp $R_y$ as shown in FIG. 28c but could also only clip a part of the beam profile. If only i.e. the part which is on the side of the leading edge is clipped the energy density at the trailing edge will not be affected. This means that the process relevant trailing edge will still have a top hat distribution while the ramp will be only in the area of the leading edge.

An asymmetrical distribution like the latter described one having a nearly top hat distribution close to the trailing edge and a ramped intensity distribution close to the leading edge can be also generated by an aberration in the focusing of the beam in the short axis $A_s$ direction y. If a cylindrical mirror with its optical power in the short axis direction is used under an incident angle Θ different to 0° significant coma will be visible. FIG. 30a shows a fraction of such a variant of the seventh embodiment according to the invention, where the cylindrical condenser lens element 57 is replaced by a cylindrical mirror 57' reflecting an incoming beam under an incident angle Θ in the order of 40°. Instead of this angle Θ=40° any other incident angle Θ >0°, preferably an incident angle Θ between 10° and 50° may be used.

The effect of coma is in the drawn FIG. 30b showing the intensity distribution of the beam along the short axis $A_s$ direction x in the (intermediate field) plane is very large due to the incident angle Θ of 40°. As known from literature coma generates an asymmetrical energy distribution. The effect could be also reached under smaller incident angles Θ by using an aspherical surface figure of the mirror 57' in the short axis $A_s$ direction. This surface figure is of the form $$p = a \times q^3 \qquad (4)$$

where p is the deviation from the spherical surface figure, q is the height at the mirror in the short axis direction and a is a constant which determines the aspheric and therefore the slope of the ramp.

Preferred Embodiment #8

An embodiment using a rod for homogenizing an incoming beam is disclosed in U.S. Pat. No. 4,918,583. FIG. 7 of this document shows an arrangement which is quite similar to that used in connection with embodiment #8 according to the present invention. While the arrangement according to the embodiment #8 homogenizes the long axis intensity distribution, the arrangement disclosed in U.S. Pat. No. 4,918,583 homogenizes an input beam in both directions, namely, the long and the short axis $A_l$, $A_s$ dimension x, y.

The eighth embodiment shown in FIGS. 31a and 31b according to a preferred version of the invention may also be used for the fabrication of polycrystalline silicon films from amorphous silicon films deposited on a substrate ("panel") using the TDX-process explained above.

FIG. 31a shows a plane view in the xz-plane of the eighth preferred embodiment of an optical system according to the invention. FIG. 31b shows the corresponding plane view in the yz-plane of said eighth preferred embodiment of an optical system according to FIG. 31a.

This embodiment comprises a light source (not shown), two homogenizing steps 81, 82, a distributed delay device (DDD) optical element 73, three imaging optics 83, 84, 85, a rotated cylindrical lens 77, an intermediate field plane 92 for optional application of a limiting module 79 and a field plane 105, where a panel 80 is placed.

As a light source a laser may be used. Preferably the laser operates at a wavelength below 600 nm. In particular an excimer laser such as a KrF excimer laser, a XeCl excimer laser or a XeF excimer laser may be used.

The first homogenizing step 81 comprises a cylindrical lens array 71 (instead of this cylindrical lens array 71 also a two stage cylindrical lens array (fly eye) as e.g. described above or a diffractive optical element (DOE) may be used) for separating an incoming beam in a plurality of beams in only one dimension (here: $A_l$) and a first convex condenser lens 72 for condensing said separated individual beams to a first pupil plane 93.

The second homogenizing step 82 comprises a cuboid rod 75 for integrating an incoming beam and a second convex cylindrical condenser lens 76 for condensing said integrated beam to a second pupil plane 112.

The DDD optical element 73 comprises a plurality of cuboid rods 73a, 73b being arranged spaced apart side by side in said long axis $A_l$ direction x. The DDD element 73 is able to selectively increase the optical path length of a beam propagating in z-direction. Instead of this configuration comprising a plurality of (cuboid) rods 73a, 73b also a bar having sections with different lengths in said z-direction as for example described in U.S. Pat. No. 4,619,508 may be used.

The first imaging optics 83 comprises said first condenser lens 72 and a further collimator lens 74. This first imaging optics 83 is able to image the focal plane of the cylindrical lens array 71 approximately into the entrance plane 97 of the rod 75.

The second imaging optics 84 comprises in the present case a convex cylindrical condensing lens 76 and a further cylindrical lens 78. The exit plane 103 of the integrator rod 75 is imaged by use of the second imaging optics 84 into the target plane 80 with a magnification factor larger than 20 to form a magnified image of said rod exit plane 103 in said first dimension x. Instead of lenses 76 and 78 also mirrors may be used.

The third imaging optics 85 comprises a cylindrical lens 114 being arranged perpendicular to the y-direction. The third imaging optics 85 is a relay optics which is able to image the field 86 illuminated by an incoming beam and being optionally limited in said first and/or second dimension by a field limiting module 79 being arranged in the field plane 92. In this conjugate field plane 92, a constriction of the incoming collimated beam is formed by a cylindrical condenser lens 113 in y direction. The reduction ratio of the relay optical system 85 may have values between 1 and 15. Instead of a lens-based imaging optics 85 also a mirror-based imaging optics or a combination thereof may be used.

Figure 32:
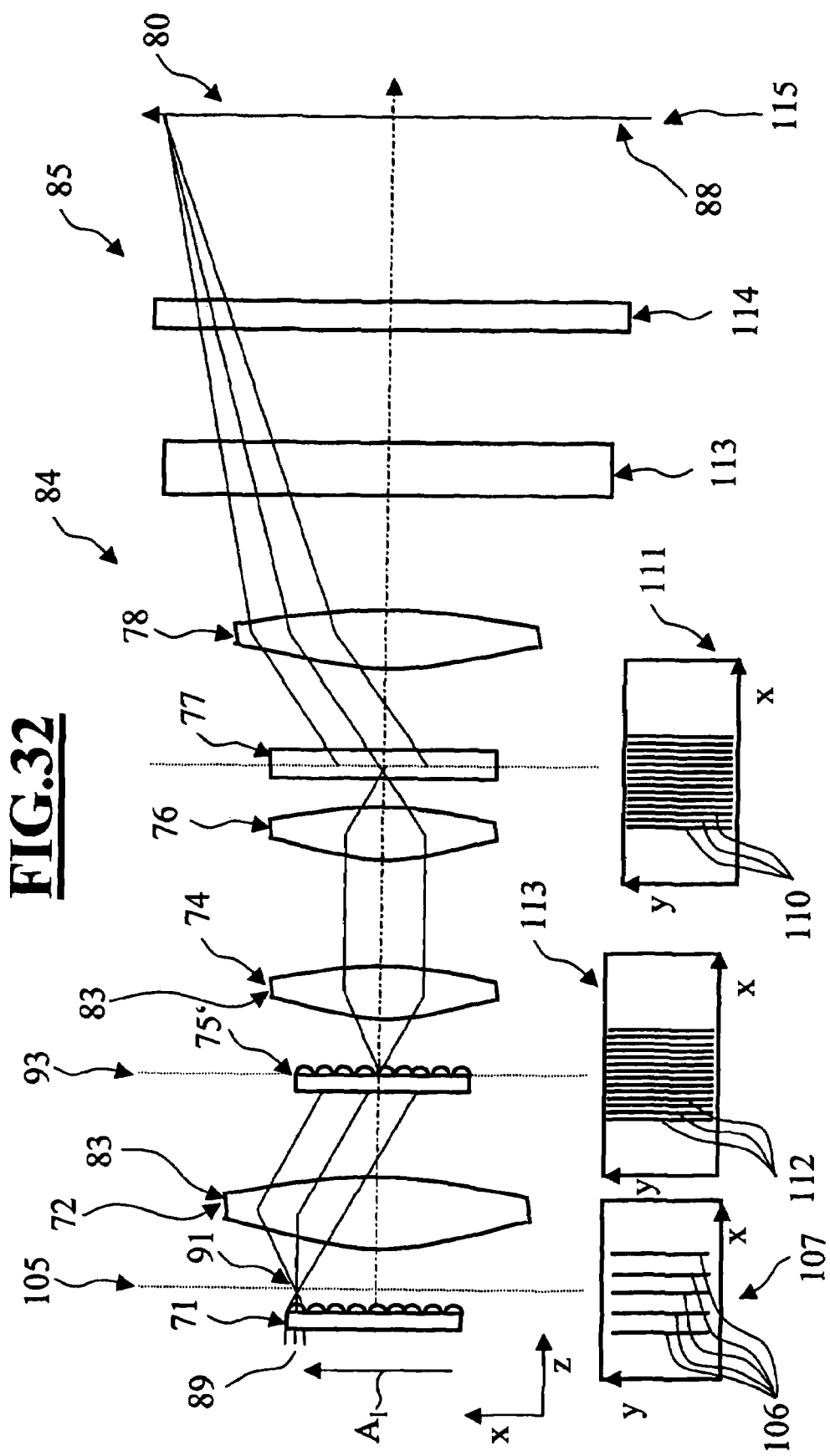
FIG. 32 is a plane view in the xz-plane of an alternative realization of the eighth embodiment of an optical system according to FIGS. 31a and 31b.

The cylindrical lens 77 is constructed similar to that as already described with respect to embodiment #7 (see above). FIG. 32 shows such a cylindrical lens 77.

This cylindrical lens may be used dependent on the angle α between the apex line 87 with respect to the long axis $A_l$ direction x to displace different incoming beams with parallel propagation direction in different directions. The detailed functionality has already been described above referring to embodiment #7. Instead of a cylindrical lens 77 also a sliced lens as described above (see FIGS. 13, 14) or an asymmetric cylindrical lens with inclined apex line as shown in FIG. 15 may be used.

As a field limiting module 79 a for example rectangular field-stop may be used as is e.g. shown in FIG. 10. Instead of a conventional field-stop also optical elements separating the useful part of the beam from the non-useful part of the beam may be used. Such a beam separating element may consist of one or a plurality of reflective, refractive or diffractive optical elements such as wedged prisms, mirrors or cylindrical lenses such as fiber with sharp boundaries deflecting the light to be separated, or, in case of a reflective separating element, structured mirrors with limited reflecting regions for reflecting the desired beam while passing the light to be separated.

The panel 80 in the present case is a planar substrate carrying a thin amorphous silicon film. Therefore the surface 88 of said panel 80 is a plane. Said panel 88 may also have a cylindrical, spherical or otherwise curved surface.

According to the present invention, the optical system shown in FIGS. 31a and 31b is capable of creating a target intensity distribution on said surface 88 of said panel 80 where the outer shape is essentially rectangular and which has a high aspect ratio exceeding 10,000 from an input light beam 89 having an arbitrary input intensity distribution.

Said light source 4 emits said input light beam 89 propagating in a propagation direction z from the left hand side of the drawing (FIGS. 31a, 31b) to the right hand side. Said input light beam 89 has an extension in a first dimension x transverse to the propagation direction z and an extension in a second dimension y transverse to said first dimension x and to said propagation direction z.

The size of the laser beam 89 is adjusted by a beam expander or by an imaging optics which images the aperture of the laser onto the cylindrical lens array 71 (not shown in FIGS. 31a, 31b). The collimated laser beam 89 shown in FIGS. 31a, 31b, hits the first homogenizing step 81 for homogenizing the beam 89 in the long axis direction x. The first homogenizing step 81 consisting in a one stage integrator comprising a cylindrical lens array 71 forms line foci 106 (shown in the first small drawing 107 at the bottom of FIG. 31b) in the focal planes 105.

The lens array 71 splits said input light beam 89 in its further propagation direction z into a plurality m of individual beams 91, wherein m corresponds to the number of cylindrical lens segments 90 being arranged adjacent to each other with their axes running along said short axis $A_s$ direction y.

In the present case the convex cylindrical condenser lens 72, the cylinder axis of which runs in y-direction, condenses said individual beams 91. The individual beams 91 overlap completely in said first dimension x in the pupil plane 93 of said homogenizing arrangement 81. Said DDD-element 73 according to the invention is arranged in said pupil plane 93 and not as for example described in U.S. Pat. No. 4,619,508 in the field plane.

If the size of the spatial coherence cell of the laser beam has equal size as the spacing of the cylindrical lens element 71 each spatial coherence cell illuminates the full pupil in the plane 73. Rays which are not passed through the DDD element will have a path length difference to rays which pass through the DDD elements of (k−1)*L, where L is the length of the DDD rods 73. In a preferred arrangement this path lengths are larger then the coherence length of the laser. In this case two different interference patterns at the field plane 116 occur. The amount of interference is reduced by a factor of $\sqrt{2}$. If the DDD elements would have been arranged in the field plane (as e.g. disclosed in U.S. Pat. No. 4,619,508) are used the same interference reduction could be achieved by a number of DDD elements equal to the number of spatial coherence cells. The number of coherence cells for an excimer laser is in the order of 20 to 100. Reducing interference by using DDD elements in the field plane would require much more elements as by using DDD elements 73 in the pupil plane 93.

The beam parts 94 penetrating said separately arranged cubic rods 73a, 73b are delayed due to the higher optical density of the rods 73a, 73b as compared to the remaining environment which is in general air.

The impact of this is that an incoming coherent beam (having a coherence length in the order of a few mm when using an excimer laser XeF at 351 nm) propagating through the DDD-element 73 and therefore partially hitting one or more of said rods and partially transmitting said DDD-element 73 mainly undisturbed is partly incoherent due to different optical paths. The length of said rods 73a, 73b preferably exceeds the coherence length by a factor of 2.

The cylindrical collimator lens 74, the cylinder axis of which runs in y-direction, collimates said (partially) incoherent (as realized by said DDD-element 73) laser beam 96 and images said beam 96 to an entrance surface 97 of said rod 75 or into said rod 75.

The illumination of the entrance 97 of the rod 75 is illuminated in the x-direction almost completely. If an improved homogenization of the rod 75 should be achieved the rod 75 could be also slightly overfilled. In this case there is an energy loss due to overfilling and also a dynamic energy variation for non symmetrical beam distribution in direction x to the long axis $A_l$ if there is time dependent beam shift.

Said entrance surface 97 of said rod 75 is covered by an anti-reflection coating (not shown) in order to reduce reflection as far as possible. As an anti-reflection coating a dielectric multilayer may be used, as well known to those skilled in the art. Said rod 75 acts as an integrator for said collimated beam 98 being conducted to said entrance surface 97. If a ray 99 inside the rod 75 hits the boundary 100a, 100b between quartz glass (which preferably will be used as a material to produce the rod 75) and surrounding air (see above) there occurs an internal reflection 101 which keeps the ray 99 in the rod 75. The extensions of the rod 75 are chosen such that the angles of the internal reflections 101 inside the rod 75 are kept below the critical angle for total reflectance in order to minimize reflectance losses as far as possible. When using a hollow rod having mirroring wedge-faces being also well known from prior art undesired losses occur due to the finite reflectivity of common mirroring layers.

After several reflections 101 an exit beam 102 with uniform intensity distribution is achieved at the exit surface 103 of the rod 75 (FIG. 31a, 31b). Similar to the example described above reflections 101 only occur in the long axis $A_l$ direction x (FIG. 31a). In this direction x the rod 75 may be slightly overfilled. In the short axis $A_s$ direction y there is no reflection (FIG. 31b). The rod size in the short axis $A_s$ direction y is larger than the beam size in the short axis $A_s$ direction y. The beam size in the short axis direction y is low due to the small divergence angle in this direction y.

The m individual beams 91 forming the entrance beam 98 of the rod 75 therefore are mixed and superimposed in said rod 75 forming n*m individual sub-beams (not shown explicitly) in said long axis $A_s$ dimension y wherein n is approximately the number of reflections occurring within said rod 75 before the beam 102 leaves the exit surface 103 of said rod 75. In detail, the number of reflection depends on incidence angles of incident beams, length, refractive index and width of the rod 82. The individual sub-beams are formed in corresponding pupil plane 112 in x-direction, as indicated in inlay 111 by focal lines 110. These focal lines intersect the tilted cylindrical lens 77 at different locations, giving rise to slightly displaced focus positions in y direction in plane 92, focused by cylindrical condenser lens 113.

In y-direction the cylindrical lens arrays 71 as well as the subsequent imaging optics 72, 74, which only act in x-direction, are without any effect. The imaging optics 72, 74 in the present case alternatively may also be used in y-direction in order to adjust the beam diameter in y-direction by means of a telescope like imaging device. In such a case at the entrance of the rod 75 in y-direction no adequate divergence angle is available which exceeds the common beam divergence of the laser beam such that inside the rod 75 in y-direction no reflectance occur (see FIG. 31b). Both, the first and the second homogenizing step 81, 82 are ineffective in y-direction and do not lead to an increase of the geometrical flux in y-direction which is defined as the product of the beam diameter in y-direction and the divergence angle in y-direction.

Instead of a rod 75 alternatively also a cylindrical lens array 75' being introduced in the pupil plane 93 or a plane deduced thereof may be used as a second homogenizing step 82. This alternative embodiment is shown in FIG. 31c. The n*m line foci 112 being generated by the cylindrical lens arrays 71 and 75' are shown in FIG. 31c as an inset 113.

The collimator lens 76 collimates said n*m individual sub-beams forming n*m line foci 110 (focal plane 112) in the short axis direction y and corresponding point foci 110 in said long axis direction x (FIG. 31b, inset 111). In short axis direction the line foci in short axis direction x correspond to collimated sub-beams having (approximately) parallel rays.

In x-direction a further collimating optics 78 together with the cylindrical optics 76 images the exit 103 of the rod 75 to the image plane 80 such that in x-direction an extensively homogenized illumination occurs. In particular the n*m line foci in the short axis direction y comprise an aperture NA in said long axis direction x and are positioned in the focal plane 112. The collimator lens 78 collimates said aperture in said long axis direction x in order to illuminate said field 86 in said x-dimension. Thereby said n*m individual sub-beams are superimposed in said long axis direction x. The superimposition leads to a homogenization in said long axis direction x.

In short axis direction the line foci in short axis direction x correspond to collimated sub-beams having (approximately) parallel rays. Each of the line foci 110 behind the second homogenizing step 82 may be slightly displaced in y-direction (which corresponds to the scan direction of the output line beam with respect to the substrate) for example by means of prisms, mirrors etc. whereby theoretically a homogenized illumination in x-direction may be generated. Such a method for generating a homogenized illumination by means of so called aperture division and prismatic parts with different displacements is well known according to the state-of-the-art. Nevertheless, such a method is not applicable in the present case. In order to realize a high efficiency, in particular when having a high aspect ratio, and a high power density only a very small lens homogenizing effect may be achieved which in the image plane only leads to a broadening of the beam cluster being limited by the laser divergence by a factor of three. Prisms having such an accuracy in angle can not be fabricated as far as the inventors know. Surprisingly, the inventors have recognized that in order to adjust accurately a very small beam offset also a displacement of a cylindrical lens may be implemented. By means of an array of slightly displaced cylindrical lenses a homogenization over very small areas has become technically possible which has not been the case according to prior art solutions.

Furthermore, the inventors have recognized that for homogenizing very narrow areas it is surprisingly sufficient to rotate a cylindrical lens having a main refraction power in y-direction slightly around the z-axis as already been described in detail with respect to the foregoing preferred embodiments.

Using such a rotatable cylindrical lens a homogeneous illumination of an image plane in a region of around the threefold of the geometrical flux of the illumination being predetermined by the laser divergence is possible. In the case where the laser divergence is oversized with respect to the narrow limitation of the illumination in y-direction, in an intermediate field plane 92 a field-stop 79 may be applied, which is imaged with the aid of cylindrical optics 85 to a final field plane 105 as will be described hereinafter. In this case the homogenization mainly serves for a homogeneous illumination of the field-stop 79 whereby the over illumination of the field-stop 79 should be as low as possible in order to reduce the light power loss to the highest degree possible.

According to the invention the beam displacing optical element 77 in the form of a cylindrical lens having an apex line 87 (in this case this apex line is in parallel to the cylindrical axis of the lens) being inclined with an incline angle α with respect to the x-direction is present for displacing at least one of said plurality of m*n individual sub-beams at least partially in said second dimension y on said field plane 86. In the present case shown in FIG. 31 the rotated cylindrical lens 77 deflects said collimated m*n individual sub-beams slightly, namely by not more than 10 μm. Each collimated individual sub-beam is deflected at another angle. Details are shown in FIGS. 28a, 28b and described above.

The focusing lens 113 focuses said individual sub-beams to said (intermediate) field plane 92. The focused m*n individual sub-beams are at least partially overlapping and form a well defined limited illumination of said field in said short axis $A_s$ direction y. FIG. 34c shows the calculated intensity distribution of the respective beam in the field plane 92 along the short axis $A_s$ using an input light beam having a Gaussian beam profile as shown in FIG. 34a.

In order to improve the edge sharpness of said output intensity distribution in said short axis $A_s$ direction y shown in FIG. 34c the edges produced by the optical arrangement described before may be clipped with the aid of a field-stop 79 or any other optical apparatus as for example mentioned above. The beam is further reduced by a reducing optics 85 and imaged to the final plane 80 shown in FIGS. 31a and 31b delivering an intensity profile along the short axis $A_s$ direction y comparable to that shown in FIG. 34b.

Figure 33:
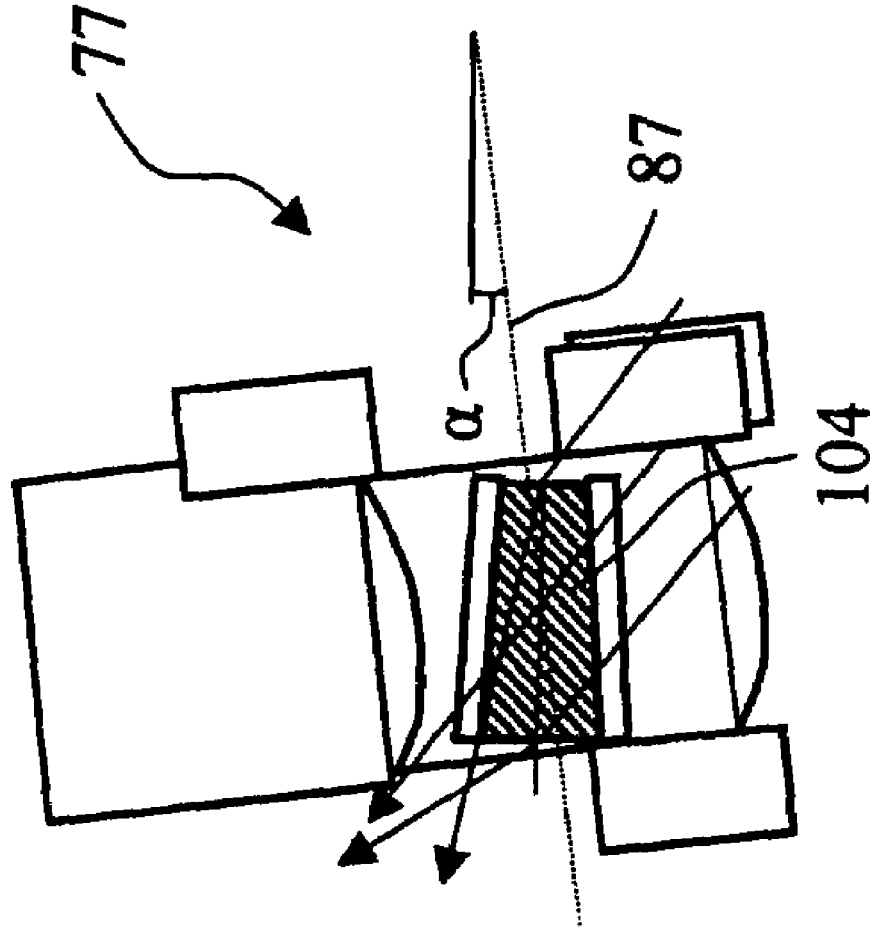
FIG. 33 is a plane view in the xy-plane of the rotated cylindrical lens as used in the eighth embodiment of an optical system according to FIGS. 30a, 30b, 30c, 31a, 31b, 31c.

In order to increase the lateral growth length of the Si-crystals an asymmetrical intensity distribution is advantageous as is already stated above. This can be achieved by clipping the laser beam profile as shown in FIG. 32 to an area being shaded in FIG. 32 before entering the rotated cylindrical lens 77. The asymmetrical beam profile can easily be created by clipping the upper and lower part with an aperture. The aperture has the shape like the hatched area 104 shown in FIG. 33. The integrated intensity over the short axis $A_s$ extension y is decreasing linearly as a function of the position in the long axis $A_l$ direction x. The integrated intensity at one position x will result in an intensity in the field (stop) plane 92 at a certain position. The position at the field (stop) plane 92 is a linear function of the long axis $A_l$ position x. Therefore also the intensity at the field (stop) plane 92 is varying with the same function as the integrated intensity at the rotated lens element 77.

Using a laser as a light source the input beam 89 itself has a divergence profile (a calculation thereof is shown in FIG. 34a) which could change in time. Without rotation of the lens element 77 this clipped divergence profile will be condensed by the lens element 78 as spatial distribution in the short axis $A_s$ direction x at the field (stop) plane 92. This profile is shown in FIG. 35b). Because of the laser divergence in the short axis direction the result at the field (stop) plane 92 is the convolution of the spatial distribution of the condensed laser divergence (FIG. 34a) and the ramp distribution (FIG. 35a) created by the rotated lens element 77. After convolution with the spatial distribution of the condensed laser divergence there is still the ramp visible (FIG. 35b).

This intensity distribution according to FIG. 35b may again be clipped by a field stop 79 or any other field limiting element being positioned in the field plane 92. The clipped field 79 may be re-imaged by the optical arrangement 85 shown in FIGS. 31a and 31b to the final plane 105.

FIG. 36 summarizes characteristic sizes of said output intensity distribution I in said short axis $A_s$ dimension y which may be achieved using an optical system as shown in FIGS. 31a and 31b and being described in detail above.

Other embodiments are in the claims.

What is claimed is:

1. An optical system to create from an incident beam of light an intensity distribution on a surface of a substrate, the optical system comprises:
   at least a first optical element which splits the incident beam into a plurality of beams some of which at least partially overlap in a first direction on said substrate surface; and
   at least a second optical element positioned to receive the plurality of beams of light from the first optical element and direct the plurality of beams towards said substrate surface,
   wherein the second optical element introduces angular differences between directions of at least a first and a second of said plurality of beams, where the angular differences displace at least part of the first beam with respect to the second beam in a second direction on said substrate surface, the second direction being essentially perpendicular to the first direction, the intensity distribution continuously extends over an area on the surface of the substrate having a dimension that is greater than 100 mm in the first direction and a dimension that is smaller than 100 μm in the second direction, where said first optical element comprises two arrays of sub-elements and said two arrays are arranged displaced along an optical axis and said second optical element is arranged between said two arrays.

2. The optical system according to claim 1, wherein the outer shape of said intensity distribution is essentially rectangular.

3. The optical system according to claim 1, wherein at least some of said plurality of beams fully overlap on said surface in said first direction.

4. The optical system according to claim 2, wherein said shape has a width between 3 and 20 μm and a length which is greater than 300 mm.

5. The optical system according to claim 1, wherein said intensity distribution is essentially homogeneous on a central area, whereby the central area is defined by an area wherein said intensity varies in said area between +5% and −5%.

6. The optical system according to claim 1, wherein said surface is cylindrical or spherical or plane.

7. The optical system according to claim 1, wherein said first optical element is a refractive or a reflective array.

8. The optical system according to claim 7, wherein said array comprises cylindrical lenses or aspherical lenses or lenses with flat surfaces or cylindrical mirrors or aspherical mirrors or plane mirrors.

9. The optical system according to claim 1, wherein said second optical element is refractive or wherein said second optical element is reflective or wherein said second optical element is diffractive.

10. The optical system according to claim 9, wherein said second optical element is a refractive array preferably comprising cylindrical lenses or aspherical lenses or lenses with flat surfaces or wedges or wherein said second optical element is a reflective array preferably comprising cylindrical or aspherical or plane mirrors.

11. The optical system according to claim 9, wherein said second optical element comprises a grating.

12. The optical system according to claim 1, wherein said second optical element comprises sub-elements.

13. The optical system according to claim 12, wherein at least one sub-element is shifted or tilted against another sub-element to displace at least one of said beams in said second direction.

14. The optical system according to claim 12, wherein said sub-elements comprise refractive elements.

15. The optical system according to claim 12, wherein said sub-elements are rotated with respect to each other, whereby the rotation axis is in parallel to said first direction or wherein said sub-elements are displaced with respect to each other in said second direction.

16. The optical system according to claim 12, wherein at least one of the sub-elements is adjustable in angle or position.

17. The optical system according to claim 1, wherein the position of the beams with respect to said second direction is measured with an optical device.

18. The optical system according to claim 17, wherein information from said optical device is used to control said adjustable sub-elements.

19. The optical system according to claim 18, wherein said control includes digital signal processing, in particular wherein said signal processing involves an algorithm to determine the best position of each of said beams.

20. A material processing apparatus comprising the optical system according to claim 1.

21. A laser annealing apparatus comprising the optical system according to claim 1.

22. The optical system according to claim 1 comprising a condenser lens to overlap said beams at least partially on said surface.

23. The optical system according to claim 22, wherein said condenser lens is a cylindrical lens.

24. The optical system according to claim 23, wherein said cylindrical lens has optical power only in the first direction.

25. The optical system according to claim 1 comprising a focusing element to focus said beams in said second direction.

26. The optical system according to claim 25, wherein said focusing element has a cylindrical surface.

27. The optical system according to claim 26, wherein said cylindrical surface has optical power only in the second direction.

28. The optical system according to claim 25, wherein said focusing element comprises said second optical element.

29. The optical system according to claim 1, wherein said sub-elements of said two arrays generate line foci of said incident light beam.

30. The optical system according to claim 1 comprising an intermediate field plane and a field stop arranged in said intermediate field plane and a relay optical system to image said field stop onto said surface.

31. The optical system according to claim 12, wherein at least one sub-element is shifted against another sub-element to displace at least one of said beams in said second direction.

32. The optical system according to claim 12, wherein at least one sub-element is tilted against another sub-element to displace at least one of said beams in said second direction.

33. The optical system according to claim 5, wherein the central area is defined by an area wherein said intensity varies between +1% and −1%.

34. The optical system according to claim 14, wherein said refractive elements comprise wedges, a prismatic power, or cylindrical lenses.

35. The optical system according to claim 12, wherein said sub-elements comprise reflective elements.

36. The optical system according to claim 35, wherein said reflective elements comprise cylindrical mirrors, aspherical mirrors, or plane mirrors.

37. The optical system according to claim 16, wherein all of said sub-elements are adjustable in angle or position.

38. The optical system according to claim 17, wherein the optical device is a CMOS detector or a photodiode array.

39. The optical system according to claim 1, wherein the at least one second optical element comprises a cylindrical lens or a toroidal lens, the beam cylindrical lens or the toroidal lens being rotated by an angle less than 20° relative to an optical axis of the optical system.

40. The optical system of claim 1, wherein the substrate comprises silicon.

41. An optical system to create from an incident beam of light an intensity distribution on a surface of a substrate, the optical system comprises:
    at least a first optical element which splits the incident beam into a plurality of beams some of which at least partially overlap in a first direction on said substrate surface; and
    at least a second optical element positioned to receive the plurality of beams of light from the first optical element and direct the plurality of beams towards said substrate surface,
    wherein the second optical element introduces angular differences between directions of at least a first and a second of said plurality of beams, where the angular differences displace at least part of the first beam with respect to the second beam in a second direction on said substrate surface, the second direction being different from the first direction, and
    the position of the beams with respect to said second direction is measured with an optical device, information from said optical device is used to control said adjustable sub-elements, where said control includes digital signal processing, in particular wherein said signal processing involves an algorithm to determine the best position of each of said beams.

42. An optical system to create from an incident beam of light an intensity distribution on a surface of a substrate, the optical system comprises:
    at least a first optical element which splits the incident beam into a plurality of beams some of which at least partially overlap in a first direction on said substrate surface, wherein said first optical element comprises two arrays of sub-elements, said two arrays being arranged displaced along an optical axis; and
    at least a second optical element positioned to receive the plurality of beams of light from the first optical element and direct the plurality of beams towards said substrate surface,
    wherein the second optical element is arranged between said two arrays and the second optical element introduces angular differences between directions of at least a first and a second of said plurality of beams, where the angular differences displace at least part of the first beam with respect to the second beam in a second direction on said substrate surface, the second direction being different from the first direction.

43. The optical system according to claim 42, wherein said sub-elements of said two arrays generate line foci of said incident light beam.

44. An optical system to create from an incident beam of light an intensity distribution on a surface of a substrate, the optical system comprises:
- at least a first optical element which splits the incident beam into a plurality of beams some of which at least partially overlap in a first direction on said substrate surface; and
- at least a second optical element positioned to receive the plurality of beams of light from the first optical element and direct the plurality of beams towards said substrate surface,
- wherein the second optical element introduces angular differences between directions of at least a first and a second of said plurality of beams, where the angular differences displace at least part of the first beam with respect to the second beam in a second direction on said substrate surface, the second direction being different from the first direction,
- and the position of the beams with respect to said second direction is measured with an optical device, the optical device being a CMOS detector or a photodiode array.

45. An optical system to create from an incident beam of light an intensity distribution on a surface of a substrate, the optical system comprises:
- at least a first optical element which splits the incident beam into a plurality of beams some of which at least partially overlap in a first direction on said substrate surface; and
- at least a second optical element positioned to receive the plurality of beams of light from the first optical element and direct the plurality of beams towards said substrate surface, the at least one second optical element comprising a cylindrical lens or a toroidal lens, the beam cylindrical lens or the toroidal lens being rotated by an angle less than 20° relative to an optical axis of the optical system,
- wherein the second optical element introduces angular differences between directions of at least a first and a second of said plurality of beams, where the angular differences displace at least part of the first beam with respect to the second beam in a second direction on said substrate surface, the second direction being different from the first direction.

46. An optical system to create from an incident beam of light an intensity distribution on a surface of a substrate, the optical system comprises:
- at least a first optical element which splits the incident beam into a plurality of beams some of which at least partially overlap in a first direction on said substrate surface; and
- at least a second optical element positioned to receive the plurality of beams of light from the first optical element and direct the plurality of beams towards said substrate surface,
- wherein the second optical element introduces angular differences between directions of at least a first and a second of said plurality of beams, where the angular differences displace at least part of the first beam with respect to the second beam in a second direction on said substrate surface, the second direction being essentially perpendicular to the first direction,
- the intensity distribution continuously extends over an area on the surface of the substrate having a dimension that is greater than 100 mm in the first direction and a dimension that is smaller than 100 μm in the second direction,
- the position of the beams with respect to said second direction is measured with an optical device and information from said optical device is used to control said adjustable sub-elements, said control including digital signal processing involving an algorithm to determine the best position of each of said beams.

47. An optical system to create from an incident beam of light an intensity distribution on a surface of a substrate, the optical system comprises:
- at least a first optical element which splits the incident beam into a plurality of beams some of which at least partially overlap in a first direction on said substrate surface; and
- at least a second optical element positioned to receive the plurality of beams of light from the first optical element and direct the plurality of beams towards said substrate surface,
- wherein the second optical element introduces angular differences between directions of at least a first and a second of said plurality of beams, where the angular differences displace at least part of the first beam with respect to the second beam in a second direction on said substrate surface, the second direction being essentially perpendicular to the first direction,
- the intensity distribution continuously extends over an area on the surface of the substrate having a dimension that is greater than 100 mm in the first direction and a dimension that is smaller than 100 μm in the second direction, and
- the position of the beams with respect to said second direction is measured with an optical device, the optical device being a CMOS detector or a photodiode array.

48. An optical system to create from an incident beam of light an intensity distribution on a surface of a substrate, the optical system comprises:
- at least a first optical element which splits the incident beam into a plurality of beams some of which at least partially overlap in a first direction on said substrate surface; and
- at least a second optical element positioned to receive the plurality of beams of light from the first optical element and direct the plurality of beams towards said substrate surface,
- wherein the second optical element introduces angular differences between directions of at least a first and a second of said plurality of beams, where the angular differences displace at least part of the first beam with respect to the second beam in a second direction on said substrate surface, the second direction being essentially perpendicular to the first direction,
- the intensity distribution continuously extends over an area on the surface of the substrate having a dimension that is greater than 100 mm in the first direction and a dimension that is smaller than 100 μm in the second direction, and
- the at least one second optical element comprises a cylindrical lens or a toroidal lens, the beam cylindrical lens or the toroidal lens being rotated by an angle less than 20° relative to an optical axis of the optical system.

* * * * *

UNITED STATES PATENT AND TRADEMARK OFFICE
CERTIFICATE OF CORRECTION

PATENT NO. : 7,538,948 B2
APPLICATION NO. : 11/318127
DATED : May 26, 2009
INVENTOR(S) : Holger Muenz, Alois Herkommer and Rafael Egger It is certified that error appears in the above-identified patent and that said Letters Patent is hereby corrected as shown below:

Sheet 16 of 21, FIG. 30b, delete "normalieed" insert --normalized--.

Column 2, line 64, delete "superpostion" insert --superposition--.

Column 4, line 43, delete "Ty" insert --$T_y$--.

Column 7, line 6, delete "eximer" insert --excimer--.

Column 12, line 28, delete "1 5b" insert --15b--.

Column 13, line 13, delete "maybe" insert --may be--.

Column 13, line 39, delete "sf" insert --sf.--.

Column 15, line 65, after "in" delete "in" (second occurrence).

Column 18, line 39, delete "Coming" insert --Corning--.

Column 22, line 32, delete "$f_{array\ 55}b$" insert --$f_{array}$ 55b--.

Column 24, line 17, delete "(FIG. $29_f$)" insert --(FIGS. 29f)--.

Column 27, line 51, delete "(FIG. 31a, 31b)" insert --(FIGS. 31a, 31b)--.

Signed and Sealed this

Fourteenth Day of July, 2009

JOHN DOLL
*Acting Director of the United States Patent and Trademark Office*